(12) United States Patent
Morris et al.

(10) Patent No.: US 7,962,604 B1
(45) Date of Patent: Jun. 14, 2011

(54) DISPLAYING ADVERTISEMENTS IN A COMPUTER NETWORK ENVIRONMENT

(75) Inventors: Harry W. Morris, Reston, VA (US); David Lowell Lippke, Bluemont, VA (US); Bob Watkins, Arlington, VA (US); Eric Bosco, McLean, VA (US); Colin Steele, Charlottesville, VA (US)

(73) Assignee: AOL Inc, Dulles, VA (US)

( * ) Notice: Subject to any disclaimer, the term of this patent is extended or adjusted under 35 U.S.C. 154(b) by 1221 days.

(21) Appl. No.: 09/690,007

(22) Filed: Oct. 17, 2000

(51) Int. Cl.
G06F 15/173 (2006.01)

(52) U.S. Cl. .... 709/224; 709/229; 705/14.4; 705/14.41; 705/14.42; 705/14.43; 705/14.49

(58) Field of Classification Search .................. 709/224, 709/225, 232, 229; 725/10, 18, 29, 42; 705/7, 705/10, 14
See application file for complete search history.

(56) References Cited

U.S. PATENT DOCUMENTS

| | | | |
|---|---|---|---|
| 5,029,104 A | 7/1991 | Dodson et al. | |
| 5,105,184 A | 4/1992 | Pirani et al. | |
| 5,305,195 A | 4/1994 | Murphy | |
| 5,347,632 A * | 9/1994 | Filepp et al. ................. | 709/202 |
| 5,572,643 A | 11/1996 | Judson | |
| 5,724,521 A * | 3/1998 | Dedrick .......................... | 705/26 |
| 5,737,619 A | 4/1998 | Judson | |
| 5,740,549 A | 4/1998 | Reilly et al. | |
| 5,742,768 A | 4/1998 | Gennaro et al. | |
| 5,754,830 A | 5/1998 | Butts et al. | |
| 5,774,534 A * | 6/1998 | Mayer ..................... | 379/142.01 |
| 5,781,894 A | 7/1998 | Petrecca et al. | |
| 5,805,815 A | 9/1998 | Hill | |
| 5,809,242 A | 9/1998 | Shaw et al. | |
| 5,828,837 A | 10/1998 | Eikeland | |
| 5,848,396 A * | 12/1998 | Gerace ............................ | 705/10 |
| 5,854,897 A * | 12/1998 | Radziewicz et al. .......... | 709/224 |
| 5,913,040 A * | 6/1999 | Rakavy et al. ................ | 709/232 |
| 5,929,849 A | 7/1999 | Kikinis .......................... | 725/113 |
| 5,933,811 A | 8/1999 | Angles et al. | |
| 5,937,392 A * | 8/1999 | Alberts ........................... | 705/14 |
| 5,946,646 A * | 8/1999 | Schena et al. ................. | 702/177 |
| 5,948,061 A | 9/1999 | Merriman et al. | |
| 5,973,683 A | 10/1999 | Cragun et al. ................ | 345/719 |
| 5,991,735 A | 11/1999 | Gerace ............................ | 705/10 |

(Continued)

FOREIGN PATENT DOCUMENTS

WO    WO 98/21664    5/1998

(Continued)

OTHER PUBLICATIONS

Gallagher, K.; Parsons, J.; "A framework for targeting banner advertising on the Internet" System Sciences, 1997, Proceedings of the Thirtieth Hawaii International Conference on, vol. 4, Jan. 7-10, 1997 pp. 265-274 vol. 4.*

(Continued)

*Primary Examiner* — John Follansbee
*Assistant Examiner* — Backhean Tiv
(74) *Attorney, Agent, or Firm* — Finnegan, Henderson, Farabow, Garrett & Dunner, LLP

(57) ABSTRACT

A method of presenting advertising to viewers in a computer network environment includes monitoring a viewer's interactions with an associated computer system, and adjusting a timing of displayed advertisements on the viewer's associated computer system based on one or more of the viewer's monitored interactions.

43 Claims, 23 Drawing Sheets

U.S. PATENT DOCUMENTS

| | | | | |
|---|---|---|---|---|
| 5,999,912 | A | 12/1999 | Wodarz et al. | |
| 6,009,409 | A * | 12/1999 | Adler et al. | 705/14 |
| 6,009,410 | A | 12/1999 | LeMole et al. | |
| 6,011,537 | A | 1/2000 | Slotznick | |
| 6,035,332 | A | 3/2000 | Ingrassia, Jr. et al. | |
| 6,108,637 | A * | 8/2000 | Blumenau | 705/7 |
| 6,119,098 | A * | 9/2000 | Guyot et al. | 705/14 |
| 6,128,651 | A * | 10/2000 | Cezar | 709/217 |
| 6,133,912 | A | 10/2000 | Montero | |
| 6,138,155 | A * | 10/2000 | Davis et al. | 709/224 |
| 6,141,010 | A * | 10/2000 | Hoyle | 715/854 |
| 6,167,235 | A * | 12/2000 | Sibecas et al. | 340/7.29 |
| 6,177,931 | B1 | 1/2001 | Alexander et al. | |
| 6,182,050 | B1 * | 1/2001 | Ballard | 705/14 |
| 6,185,586 | B1 | 2/2001 | Judson | |
| 6,230,204 | B1 * | 5/2001 | Fleming, III | 709/229 |
| 6,250,428 | B1 * | 6/2001 | Amo et al. | 187/391 |
| 6,285,985 | B1 * | 9/2001 | Horstmann | 705/14 |
| 6,299,934 | B1 * | 10/2001 | Manning | 427/137 |
| RE37,456 | E * | 11/2001 | Brisson | 379/93.22 |
| 6,314,451 | B1 | 11/2001 | Landsman et al. | |
| 6,317,761 | B1 | 11/2001 | Landsman et al. | |
| 6,317,789 | B1 * | 11/2001 | Rakavy et al. | 709/224 |
| 6,339,761 | B1 * | 1/2002 | Cottingham | 705/14.66 |
| 6,351,736 | B1 * | 2/2002 | Weisberg et al. | 705/14.46 |
| 6,457,025 | B2 | 9/2002 | Judson | |
| 6,460,036 | B1 * | 10/2002 | Herz | 707/10 |
| 6,463,468 | B1 * | 10/2002 | Buch et al. | 709/219 |
| 6,466,967 | B2 | 10/2002 | Landsman et al. | |
| 6,484,148 | B1 * | 11/2002 | Boyd | 705/14.64 |
| 6,502,076 | B1 * | 12/2002 | Smith | 705/14.54 |
| 6,636,247 | B1 * | 10/2003 | Hamzy et al. | 715/808 |
| 6,647,257 | B2 * | 11/2003 | Owensby | 455/414.1 |
| 6,654,725 | B1 * | 11/2003 | Langheinrich et al. | 705/14.52 |
| 6,763,379 | B1 * | 7/2004 | Shuster | 709/224 |
| 6,771,290 | B1 * | 8/2004 | Hoyle | 715/745 |
| 6,799,209 | B1 * | 9/2004 | Hayton | 709/223 |
| 6,820,277 | B1 * | 11/2004 | Eldering et al. | 725/35 |
| 6,876,974 | B1 * | 4/2005 | Marsh et al. | 705/14 |
| 6,892,354 | B1 * | 5/2005 | Servan-Schreiber et al. | 715/733 |
| 7,103,099 | B1 * | 9/2006 | Paz et al. | 375/240.03 |
| 7,103,643 | B1 * | 9/2006 | Jacobs et al. | 709/219 |
| 7,548,874 | B2 * | 6/2009 | Kanevsky et al. | 705/14.67 |
| 2001/0034637 | A1 | 10/2001 | Lin et al. | |
| 2002/0010623 | A1 * | 1/2002 | McCollom et al. | 705/14 |
| 2002/0013174 | A1 | 1/2002 | Murata | |
| 2002/0016736 | A1 * | 2/2002 | Cannon et al. | 705/14 |
| 2002/0077130 | A1 * | 6/2002 | Owensby | 455/466 |
| 2005/0026694 | A1 * | 2/2005 | Kelly et al. | 463/42 |
| 2006/0036495 | A1 * | 2/2006 | Aufricht et al. | 765/14 |
| 2007/0038728 | A1 * | 2/2007 | Jacobs et al. | 709/219 |

FOREIGN PATENT DOCUMENTS

| WO | WO 99/13423 | * | 3/1999 |
|---|---|---|---|

OTHER PUBLICATIONS

New WebTV-based Internet Receiver FAQ, http://developer.webtv.net/itv/2.3-2.3.5/main.htm, pp. 1-4, Jun. 23, 1999.

New WebTV-based Internet Receiver FAQ, http://developer.webtv.net/itv/2.2.2/main.htm, pp. 1-6, Jun. 9, 1999.

Introduction to WebTV, http://developer.webtv.net/design/whydev/whydev.htm, pp. 1-2, May 13, 1999.

Interactive TV Link Checksum Tool, http://developer.webtv.net/itv/tvlink/main.htm, pp. 1-2, May 12, 1999.

Interactive TV Examples, http://developer.webtv.net/itv/examples/demo1/main.htm, pp. 1-4, Jun. 2, 1999.

Displaying TV in Web Pages, http://developer.webtv.net/itv/embedtv/main.htm, pp. 1-3, Jun. 9, 1999.

What is Interactive TV?, http://developer.webtv.net/itv/whatis/main.htm, pp. 1-5, Jun. 9, 1999.

Interactive TV Examples, http://developer.webtv.net/itv/examples/main.htm, p. 1, Jun. 9, 1999.

Interactive TV on WebTV and Windows 98, http://developer.webtv.net/itv/win98/main.htm, pp. 1-2, May 12, 1999.

Interactive TV Links, http://developer.webtv.net/itv/links/main.htm, pp. 1-7, Jun. 9, 1999.

WebTV Products, http://www.webtv.net/products/index.html, p. 1, by WebTV Networks, Inc.

WebTV—Plus, http://www.webtv.net/products/plus/index.html; pp. 1-2, by WebTV Networks, Inc.

WebTV—Plus Features, http://www.webtv.net/products/plus/wantmore.html, pp. 1-2, by WebTV Networks, Inc.

WebTV—Plus Features, http://www.webtv.net/products/plus/wantmore2.html, p. 1, by WebTV Networks, Inc.

WebTV—Plus Features, http://www.webtv.net/products/plus/wantmore3.html, p. 1, by WebTV Networks, Inc.

WebTV Classic—Features, http://www.webtv.net/products/classic/wantmore.html, p. 1, by WebTV Networks, Inc.

WebTV Classic, http://www.webtv.net/products/classic/index.html, p. 1, by WebTV Networks, Inc.

WebTV—Plus Specifications, http:/www.webtv.net/products/plus/specs.html; pp. 1-2, by WebTV Networks, Inc.

WebTV—Questions and Answers, http://www.webtv.net/products/questions/index.html, pp. 1-9, by WebTV Networks, Inc.

WebTV Classic, http://www.webtv.net/products/classic/index.html, p. 1, by WebTV Networks, Inc.

WebTV Classic-Features, http://www.webtv.net/products/classic/wantmore2.html, pp. 1-2, by WebTV Networks, Inc.

Graham, Ian S.; *The HTML Sourcebook, Second Edition, A Complete Guide to HTML 3.0*, Wiley Computer Publishing, 1996, pp. 235-241.

Definition of "advertisement", "The American Heritage Dictionary," Second College Edition, Houghton Mifflin Company, 1982, front cover, copyright page and p. 82. (3 pages total).

"Computer Dictionary," 1997, Microsoft Press, third edition, front cover, copyright page, and p. 228. (3 pages total).

* cited by examiner

DISPLAYING ADVERTISEMENTS IN A COMPUTER NETWORK ENVIRONMENT

TECHNICAL FIELD

The invention relates to displaying advertisements in a computer network environment, for example, on the Internet.

BACKGROUND

The computer system 100 illustrated in FIG. 1 represents a typical computer setup for executing software that allows a user to perform tasks such as communicating with other computer users, accessing various computer resources, and viewing, creating, or otherwise manipulating electronic content— that is, any combination of text, images, movies, music or other sounds, animations, 3D virtual worlds, and links to other objects. The system includes input/output (I/O) devices (e.g., a mouse 103, a keyboard 105, and a display 107) and a general purpose computer 110 having a central processor unit (CPU) 115, an I/O unit 120 and a memory 125. The memory 125 stores data and various programs such as an operating system 130, and one or more application programs 135. The computer 110 also typically includes some sort of communications card or device 140 (e.g., a modem or network adapter) for exchanging data with a network 145 through a communications link 150 (e.g., a telephone line).

As shown in FIG. 2, a user of a computer system 200 can access electronic content or other resources either stored locally at the user's own client system 205 (for example, a personal or laptop computer) or remotely at one or more server systems 210. Communications between the client system 205 and the server system 210 may be provided, for example, by a direct dial up through a modem 215 and a telephone network 220, or through a network connection 225 using, for example, the TCP/IP protocol.

An example of a server system 210 is a host computer that provides subscribers with online computer services such as e-mail, e-commerce, chat rooms, Internet access, and electronic newspapers and magazines. Users of a host computer's online services typically communicate with one or more central server systems 210 through client software executing on their respective client systems 205.

In typical practice, a server system 210 will not be a single monolithic entity. Rather, it will be a network of interconnected server computers, possibly physically dispersed from each other, each dedicated to its own set of duties and/or to a particular geographical region. In such a case, the individual servers are interconnected by a network of communication links. One such server system is provided by America Online, Inc. of Virginia.

A "browser" is an example of client software that enables users to access and view electronic content stored either locally or remotely, such as in a network environment (e.g., a local area network (LAN), an intranet, or the Internet). A browser typically is used for displaying documents described in Hyper-Text Markup Language (HTML) and stored on servers connected to a network such as the Internet. A user instructs a browser to access an HTML document, or web page, by specifying a network address—or Uniform Resource Locator (URL)—at which a desired document resides. In response, the browser contacts the corresponding server hosting the requested web page, retrieves the one or more files that make up the web page, and then displays the web page in a window on the user's computer screen.

FIG. 3 is a screenshot of a browser application 300 (Microsoft Internet Explorer) displaying a typical HTML document, or web page 302. As shown therein, a single web page 302 may be composed of several different files that may be of different data types 304 (for example, text, graphics, images, virtual worlds, sounds, or movies). In addition, a web page can include links 306 pointing to other resources (for example, web pages or individual files) available on the network. Links 306 can take virtually any visual form. For example, a link can appear either as a text string, a graphical image, or a combination of the two. Each link 306 has an associated URL pointing to a location on the network. When a user clicks on, or otherwise selects, a displayed link 306, the browser automatically retrieves the web page (or other resource) corresponding to the link's associated URL and displays it to, or executes it for, the user.

Many commercial web-site operators generate revenue by displaying advertisements (or ads) on their web pages. A typical ad is displayed as a "banner"—a generally rectangular graphic image that serves as a link to another web site or URL. FIG. 3, for example, shows a web page that includes four ads 307-310.

Typically, ads are sold on the basis of cost per thousand impressions (CPM). The definition of an impression varies between advertising mediums. For example, when a radio station plays a commercial, each person tuned to that station counts as an impression. For billboards, each passing motorist that views the billboard counts as an impression. Likewise, each person that is likely to read a display ad in a magazine counts as an impression for that ad. In an interactive media, such as the Internet, each computer screen to which a promotional message is delivered counts as an impression. In all cases, it is the potential that the person saw or heard the ad that constitutes an impression; it is not necessary for the person to actually mentally register the ad or respond to it.

The term "inventory" is used to define the number of potential impressions that an advertising vehicle can generate within a given time frame. For example, an owner of ten billboards on a highway with 10,000 passing motorists a day has a daily inventory of 100,000 ad impressions. This inventory then is sold (e.g., as a paid ad on the billboard). Most advertising inventory is sold in minimum units of 1,000 impressions. The CPM charged to an advertiser varies widely; for example, a late night cable TV ad might be sold at $1 CPM while direct response ads for premium products to a very targeted audience might be sold at $200 CPM. Internet advertising typically is sold anywhere in the $1-$120 range, with most sales falling in the $20-$40 range.

Advertisers create media plans that detail the specifics of an advertising campaign. Typical elements of a media plan include: (1) a budget; (2) a time frame; (3) a target audience; (4) reach (how many people should see the advertising); (5) frequency (how often each person should see the advertising); (6) quantity (derived from the product of reach and frequency); and (7) placement (where the advertising should be presented, such as, for example, on the Internet, on radio, or in a newspaper. Media plans can vary dramatically based on the product being marketed. For example, a movie studio may want to reach a large percentage of the U.S. population within one week of a major blockbuster release, with each person seeing or hearing an ad for the movie at least five times. The movie studio's media plan might call for placement of advertising on primetime television on all major television networks as well as on drive-time radio on the top three radio stations in every major market.

On the other hand, a high-risk, high-yield mutual fund company interested in marketing a mutual fund product to sophisticated investors with money to invest might want to target only the wealthiest one percent of the U.S. population, with each person seeing the ad twenty times over a three-month period. The mutual fund company's media plan might call for placement of advertising on news and business cable stations, in The Wall Street Journal, and in investor publications. Comparing total spending on their media plans, the movie studio is likely to spend more money on its four-day campaign than the mutual fund company will spend on its three-month campaign. However, because of its placement and targeting, the mutual fund company is likely to purchase its advertising at a much higher CPM.

Similar media plans can be developed for owners of computer network environments, such as web page hosts and operators. Different web pages may be targeted at different audiences with different interests. Some web pages may be general in nature while others may be specific. For example, FIG. 3, which is a screen shot of AOL Inc.'s web page http://www.aol.com, illustrates an example of a general web page. Some of the links 306 to other web pages that can be accessed from that page are specific, such as the gardening web page 320 shown in FIG. 4. Accordingly, ads placed on the general web page 302 are more likely to be seen by a larger audience than ads placed on the gardening web page 320. However, ads placed on the gardening web page 320 are more likely to be seen by viewers interested in gardening and, therefore, the CPM of impressions sold for the gardening web page are likely to be higher than the CPM of impressions sold for the general web page 302.

Advertising is prevalent on web sites, web TV systems, and browsers, and is likely to experience increased use in these and other computer network-based applications because it provides a source of income for web site operators, just as it does for owners of television stations, billboards, radio stations, and magazines. This income, in turn, may be used to subsidize the cost of the web site and services offered by the website to the end user, and often may make the services free to the end user.

A web page, when displayed in a browser, occupies some portion of the available "real estate" (i.e., visible area) of a user's display monitor. The screen real estate occupied by a given web page typically is divided among ads, links, substantive information, and search engines. Each different type of web page content (e.g., ads, links, or substantive information) can be associated with a different screen real estate area.

As shown in FIG. 5, which shows different types of web page content, in a web page 500, links 505 appear at one screen area, substantive information 510 appears at another screen area, ads 515 appear at yet another screen area, and so on. When new web page content is to be displayed to a user, the web page typically will be redisplayed with the old content being replaced by new content of the same type and positioned at the same screen area. For example, as shown in FIG. 6, which shows a screenshot of the same web page as FIG. 5 when accessed at another time, ad 515 has been replaced by another ad 520 in the same screen real estate area 523. In this example, the ad displayed in screen real estate area 523 alternates between two advertisers and, further, referring also to FIG. 7, between ad 520 and a related ad 530 displayed in screen real estate area 523 each time that the web page is accessed. The design of the display and its changing nature are intended to offer variety in the ads appearing in screen real estate area 523.

Users viewing content on the Internet typically do not view an entire page devoted only to advertising. As illustrated in FIGS. 5-7, web pages typically include substantive content or serve as a "menu" with links to other sites having substantive content. Although web pages potentially could consist entirely of ads, typically it is the substantive content that draws viewers to a particular web page and retains their interest. Accordingly, ads generally are displayed in less obtrusive screen real estate, such as in an upper or lower corner. To encourage a user to notice an ad, and to retain the user's attention, marketing researchers have developed techniques relating to the display of content in the screen's advertising real estate. These techniques include varying the ads displayed on a certain screen over time, displaying animated or static graphic interface format (GIF) files, generating sounds, displaying interactive ads, and varying the sponsor and content of the ads.

SUMMARY

In one general aspect, a method of presenting advertising to viewers in a computer network environment includes monitoring a viewer's interactions with an associated computer system, and adjusting a timing of advertisements displayed on the viewer's associated computer system based on one or more of the viewer's monitored interactions.

Implementations may include one or more of the following features. For example, adjusting the timing may include adjusting an ad expiration tuning parameter that is configured to set the quantity of time for which an advertisement is available for display, the time of displayed advertisements may be adjusted in a way designed to capture a user's attention, such as by changing advertisements only after the user has been idle for a short, specified period of time (e.g., 5 seconds). In addition, adjusting a maximum display count that sets a maximum number of times an advertisement may be displayed to a user viewing a batch of ads, adjusting a minimum display time that sets a minimum amount of time that an advertisement may be displayed before another advertisement is displayed, adjusting an idle delay that causes a delay from the time a user has gone idle before a first advertisement is replaced with another advertisement, adjusting an active delay that causes a delay from the time a user goes active before displaying another advertisement, and adjusting an idle (no spin) timer that stops the display of a first advertisement from being replaced with the display of another advertisement after a user goes idle for so long that is it unlikely that the user is actually looking at the screen.

Monitoring a viewer's interactions with an associated computer system may include monitoring a maximization and minimization status of a window displaying advertising, and monitoring occlusion of that window. If the window is minimized or occluded, the method may include not switching between advertisements. Monitoring a viewer's interactions with an associated computer system also may include monitoring a viewer's use of a device that sends an input, or causes an input to be sent, to the associated computer system. For example, monitoring a viewer's interactions with an associated computer system may include monitoring use of a computer mouse, a computer keyboard, and/or a microphone.

In another general aspect, a system for presenting advertising to viewers in a computer network environment includes software programmed to monitor a viewer's interactions with an associated computer system, and software to adjust a timing of advertisements displayed on the viewer's associated computer system based on one or more of the viewer's monitored interactions.

In another general aspect, displaying advertisements in a computer network environment includes providing advertisements, providing one or more tuning parameters configured to cause a display of a first advertisement to be changed to a display of another advertisement, and downloading the advertisements and tuning parameters to a viewer's computer.

In another general aspect, optimizing a click-through rate of a user viewing content in a computer network environment includes providing advertisements, providing a set of tuning parameters, downloading the advertisements and tuning parameters to the user's computer, storing click-through information for the advertisements, and sending the click-through information to a host computer. The tuning parameters are configured to cause a display of a first advertisement on a user's computer to be changed to a display of another advertisement on the user's computer based on the user's activity with respect to the user's computer.

Implementations may include one or more of the following features. For example, the tuning parameters downloaded to the user's computer may be varied, and a correlation technique may be used to determine a correlation between the tuning parameters downloaded to the user's computer and the click-through rate of the user. A set of tuning parameters may be associated with each individual ad, or with a group of ads. Another set of tuning parameters may be set based on the correlation between the tuning parameters and the user's click-through rate. This correlation may be further refined by user or by class of user (e.g., by different age groups). In another general aspect, a system for timing the display of advertisements on a web page includes a host computer, a set of at least a first advertisement and a second advertisement, a set of tuning parameters stored on the host computer, and a software program stored on the host computer and including the set of tuning parameters. The tuning parameters are configured to cause a display of the first advertisement to be changed to a display of the second advertisement and are downloadable to a user computer.

The techniques for timing the display of ads provide numerous advantages. For example, timing the start of an ad to coincide with the time that viewers are most likely to be viewing the screen increases the likelihood that viewers actually will view the ad. Timing an ad to end a set amount of time after the ad starts increases the likelihood that viewers will have time to view the ad and decide to click through the ad. By increasing the likelihood that viewers will click through the ad, the CPM for the web site on which that ad is displayed can be increased, which increases the revenue for the web site host or operator. In addition, the methods and techniques for optimizing the tuning parameters can be further used to optimize click-through rates of, for example, ads, web pages, users, and groups of users.

The systems and techniques described here for displaying ads such that they catch and hold viewers' attention are based in part on the premise that viewers tend to pay attention to the transition from one ad to another. Accordingly, by continually varying the lengths of time during which ads are displayed, as well as by basing the transition between ads on viewers' interactions with a computer displaying the ads, the viewers will become and remain engaged. For example, the ads can be transitioned at various times after the user has gone idle with respect to the computer.

Varying the lengths of time that ads are displayed and transitioning between ads based on viewers' interactions can be implemented in systems and techniques using tuning parameters, such as are described below. Such systems and techniques can be employed in virtually any Graphical User Interface (GUI) or other display environment in which content is presented to viewers. For example, the systems and techniques can be employed to considerable advantage in association with an instant messaging GUI. Other examples where similar ad timing techniques could be used include web browsers, web-based TV systems, chat room GUIs, and the like.

The details of one or more embodiments are set forth in the accompanying drawings and the description below. Other features and advantages will be apparent from the description and drawings, and from the claims.

DETAILED DESCRIPTION

Figure 1:
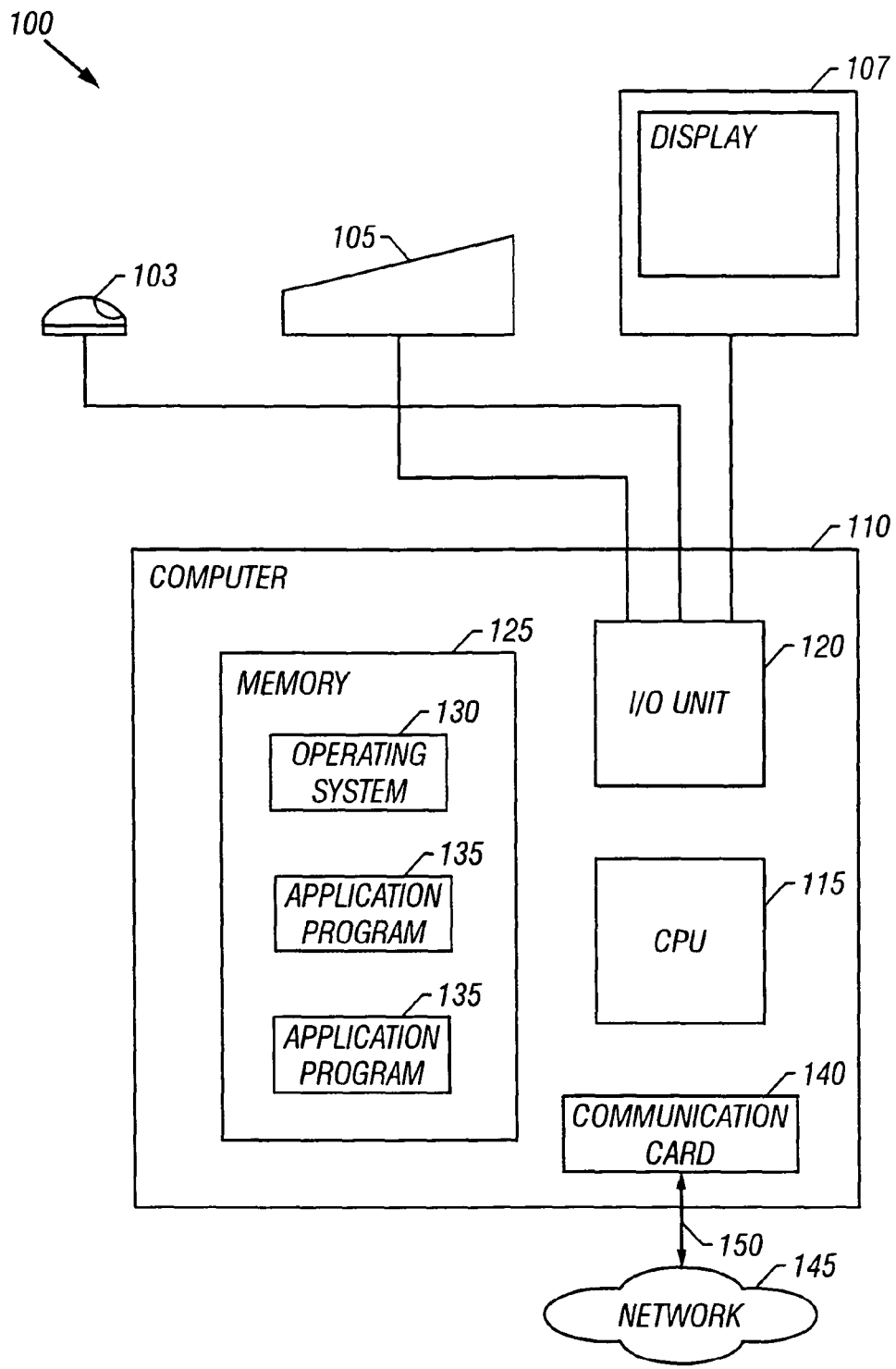
FIG. 1 is a block diagram of a computer system.
Figure 2:
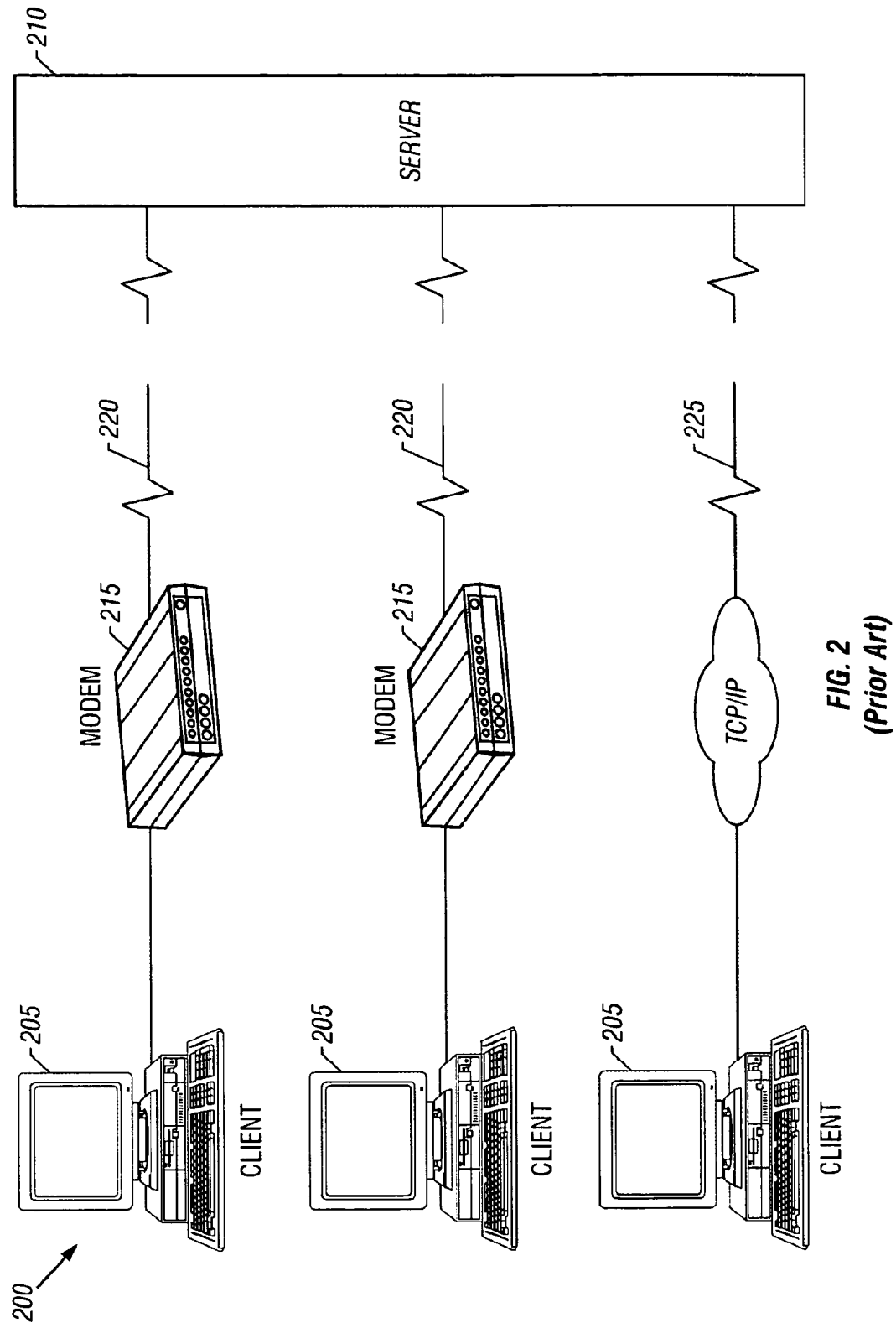
FIG. 2 shows a typical network computing environment.
Figure 3:
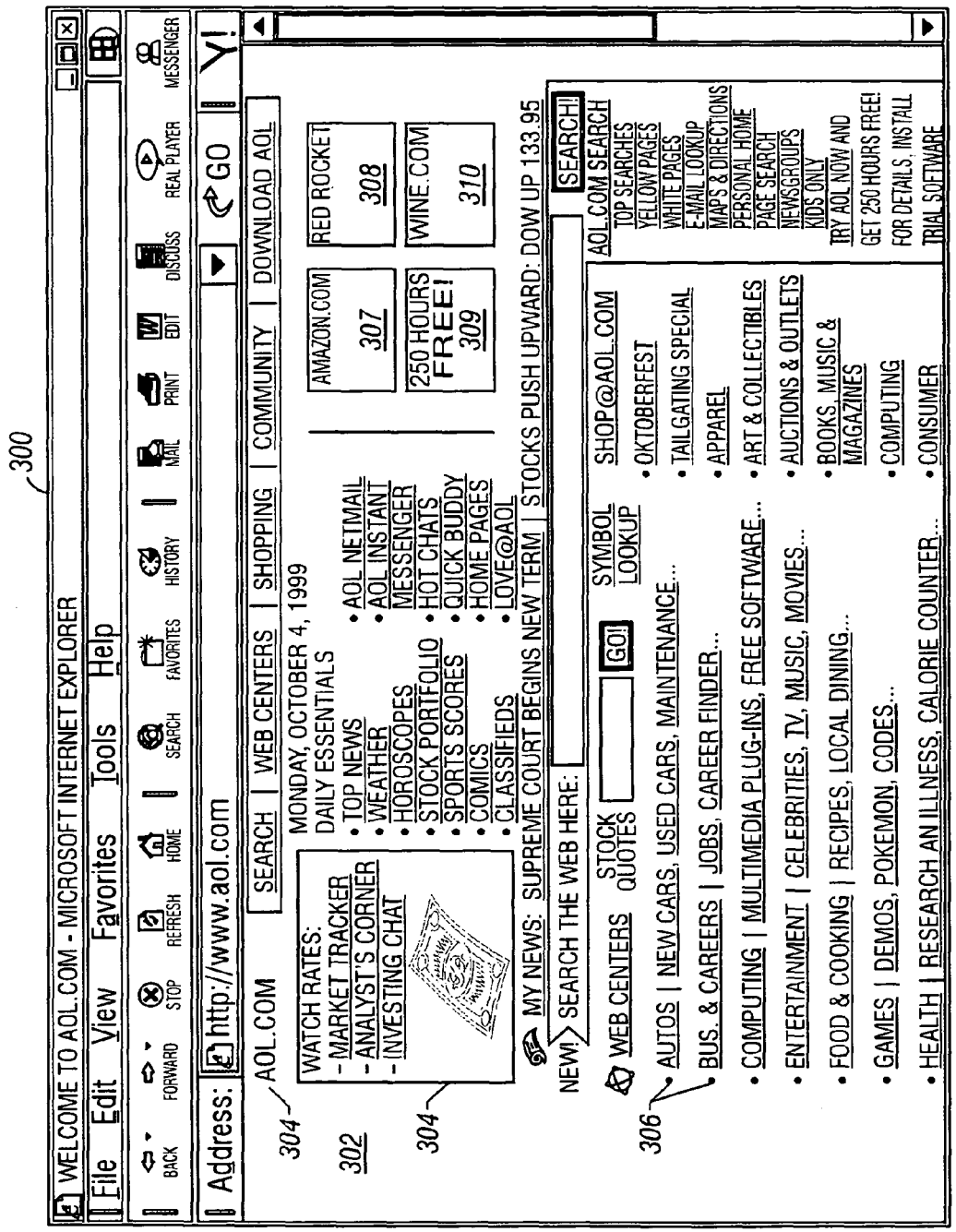
FIGS. 3 and 4 show a screenshot of a browser displaying a web page.
Figure 4:
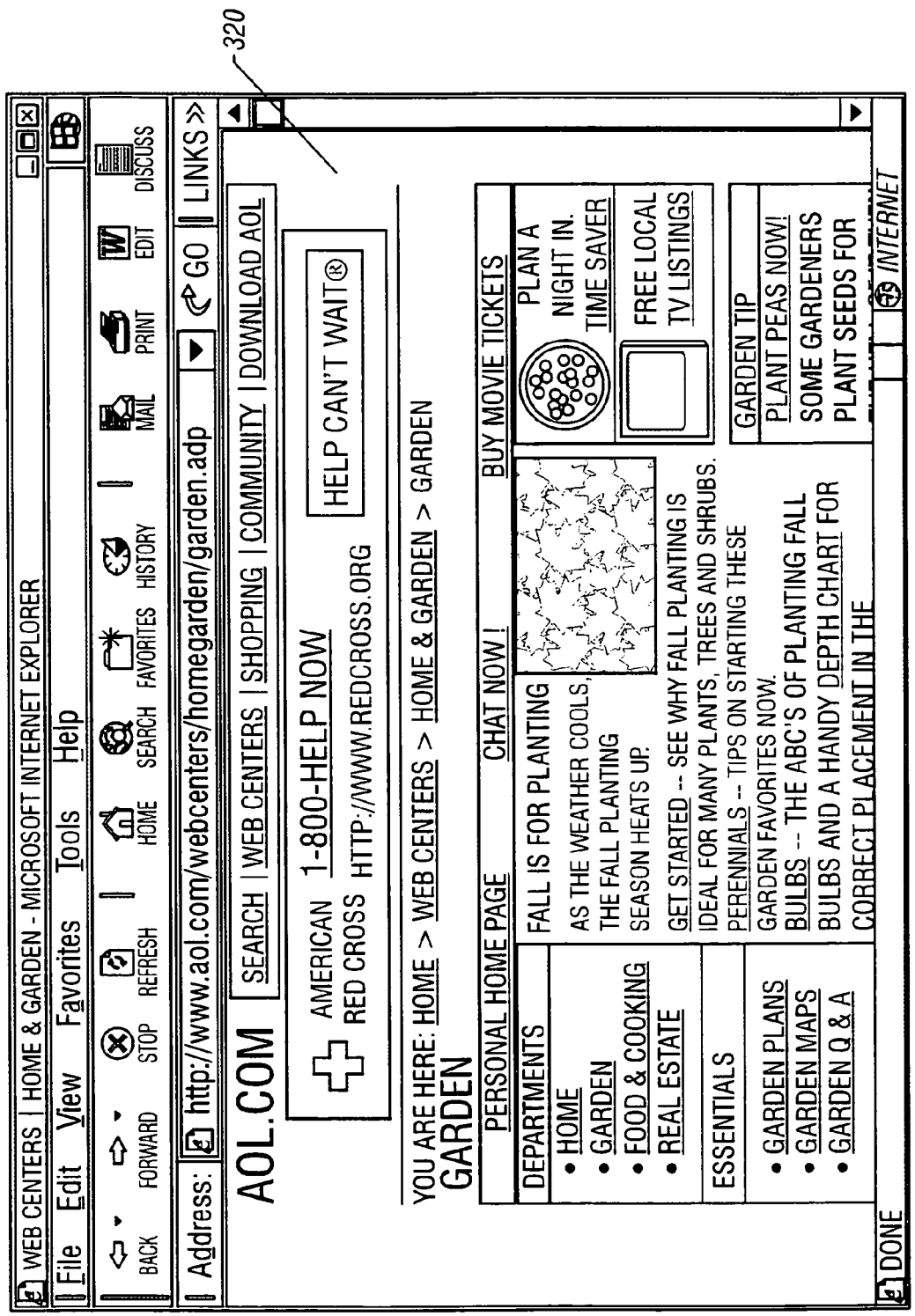
Figure 5:
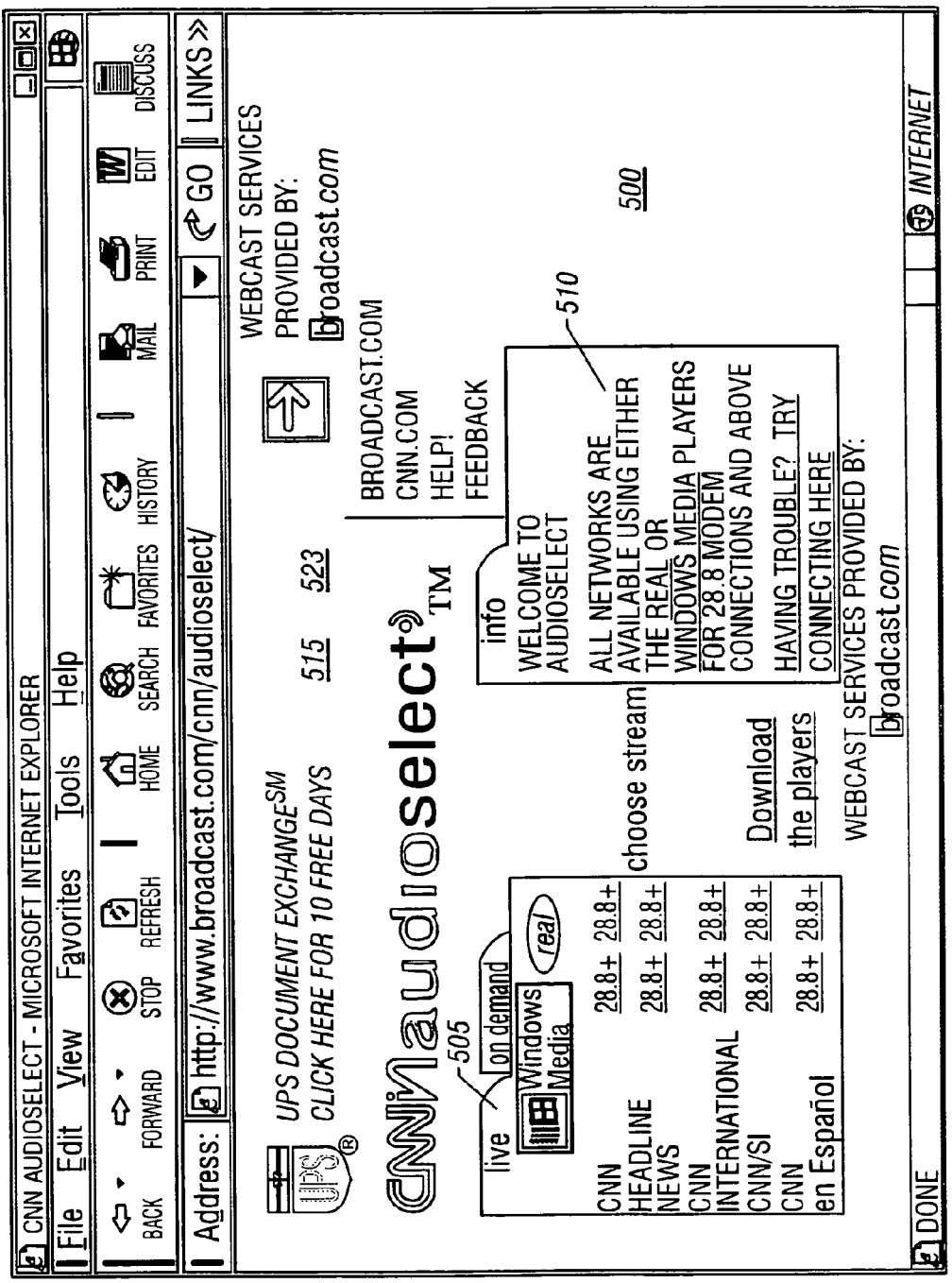
FIGS. 5-7 are screenshots of a web page at successive points in time.
Figure 6:
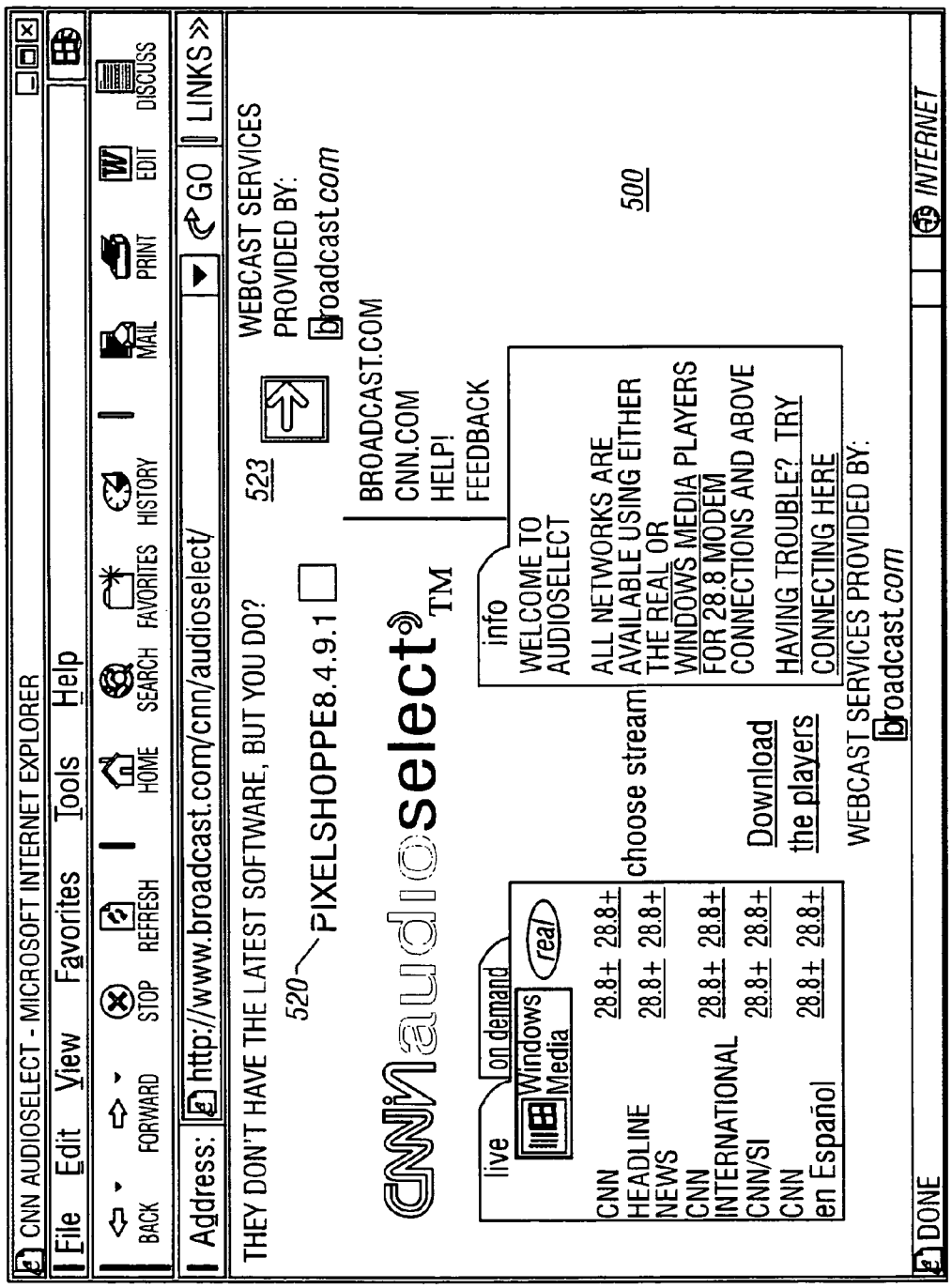
Figure 7:
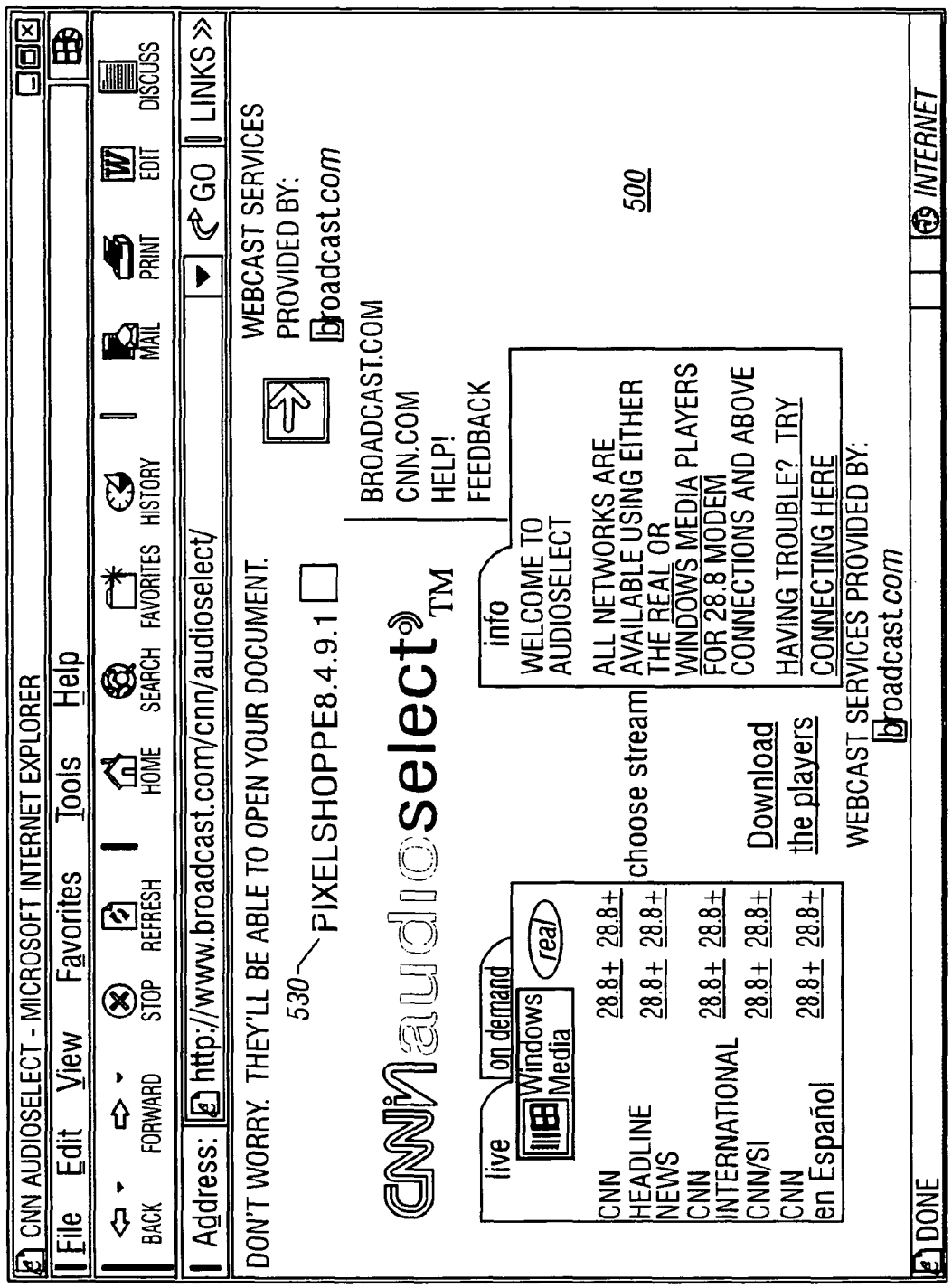
Figure 8:
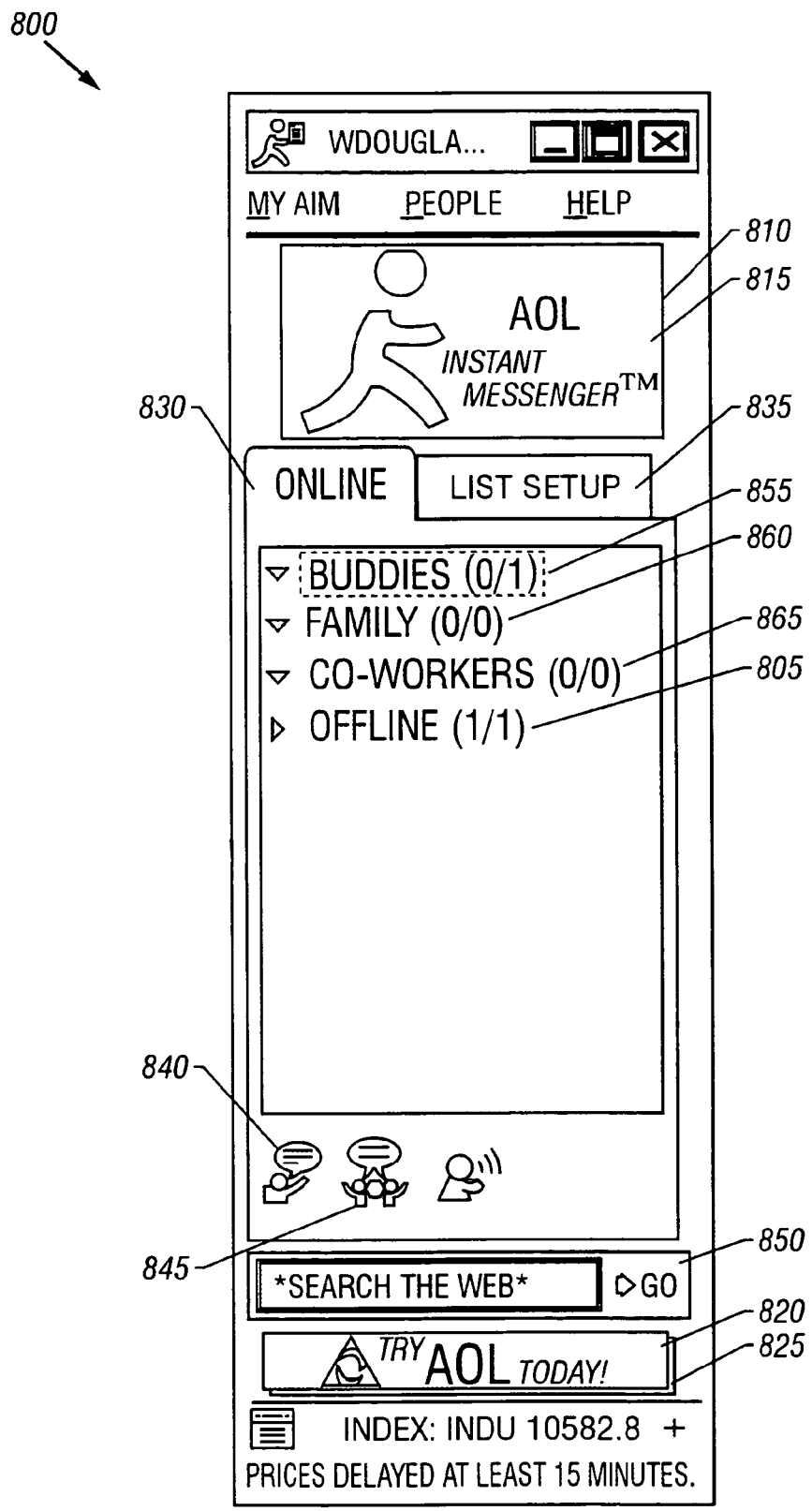
FIGS. 8-12 are screenshots of an instant messaging system.

Referring to FIGS. 8-12, an instant messaging system 800, such as AOL's Instant Messenger (AIM), includes a "Buddy List" window 805 that presents a list of a user's buddies that are currently online. The buddy list window 805 includes an upper "hot spot" 810 (an active region that can be sensed when the curser is atop it and can be used to trigger other actions) displaying an upper ad 815, a lower advertising hot spot 820 displaying a lower ad 825, a list of people online tab 830, a list setup tab 835, a link 840 for sending messages, a link 845 for sending a buddy chat invitation, and other links 850 to the web. The list of people online 830 is divided into categories, such as buddies (i.e., friends) 855, family 860, and co-workers 865. The categories can be uniquely specified by an individual user.

Figure 9:
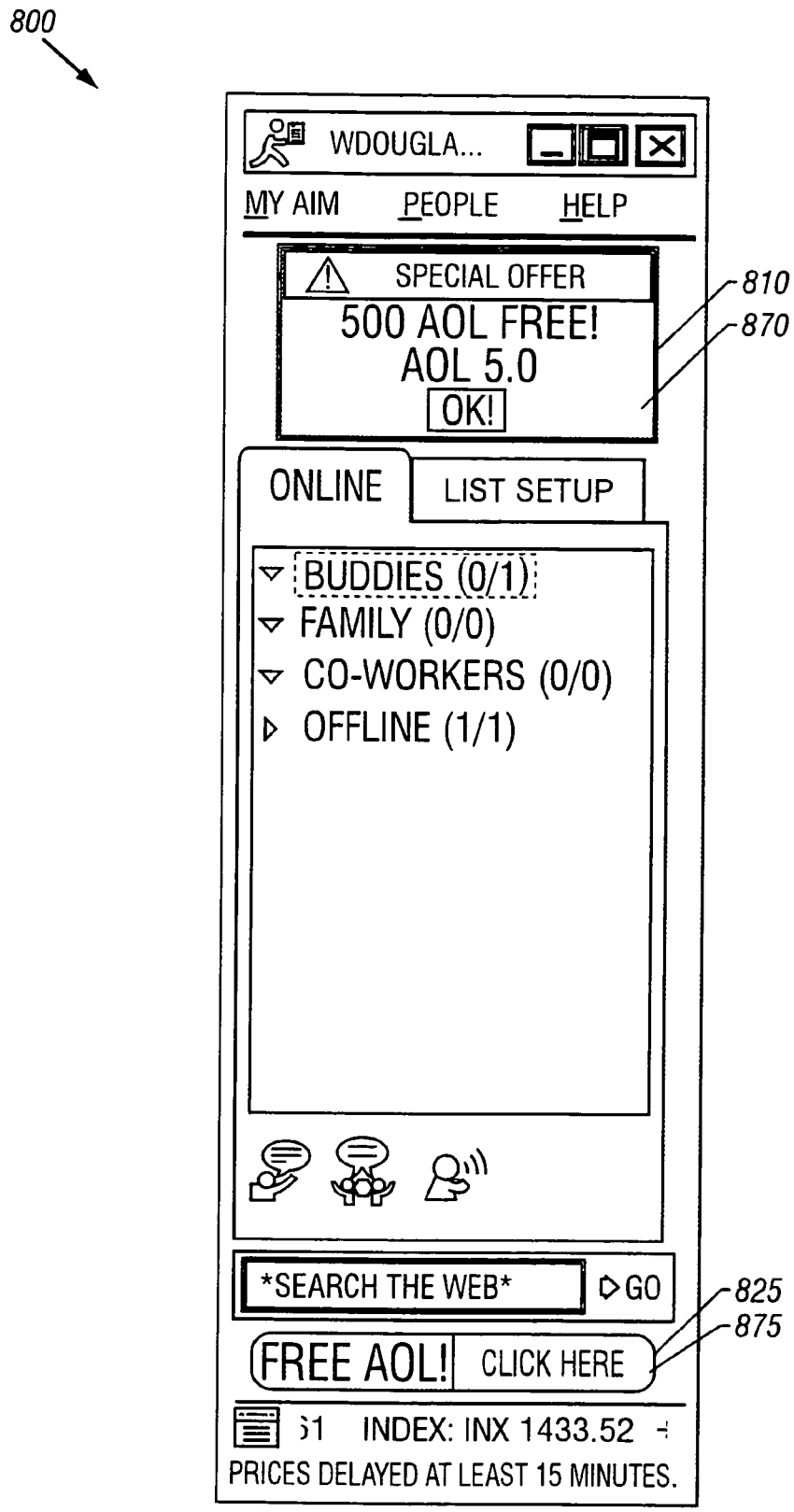

The ads presented in upper advertising hot spot 810 and lower advertising hot spot 820 can be changed periodically to display a series of different ads. The ads 815 and 825 displayed in hot spots 810 and 820, respectively, can be changed simultaneously or at different times. For example, as illustrated in FIG. 9, the upper ad 815 has been replaced with another ad 870, while the lower ad 825 has been replaced with another ad 875.

Figure 10:
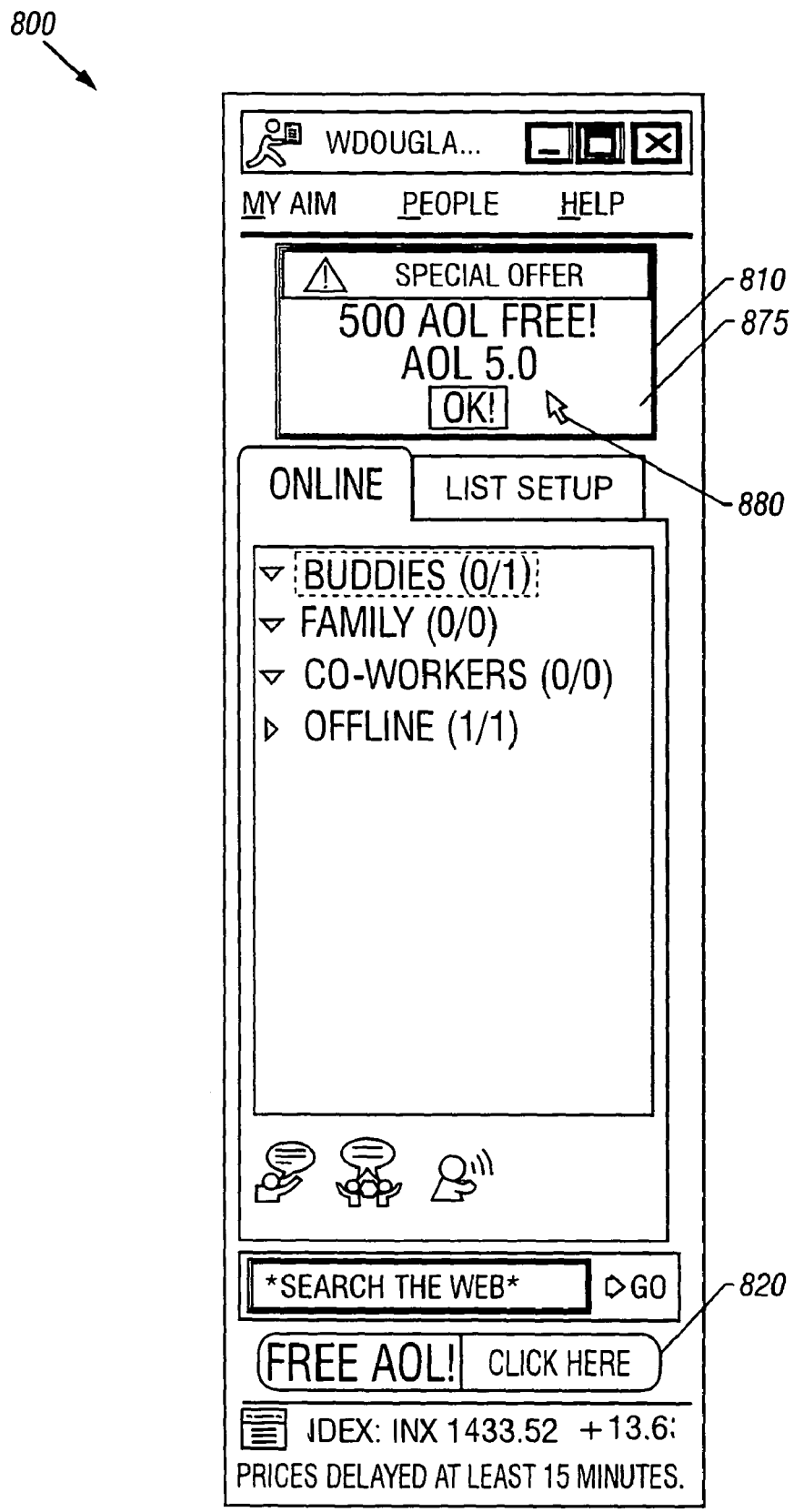

As illustrated in FIG. 10, the ad 875 is an animated ad in which a cursor 880 moves across the ad 875, and is designed to catch the user's attention. Other forms of animated advertising also can be displayed in the upper advertising hot spot 810 and the lower advertising hot spot 820.

Figure 11:
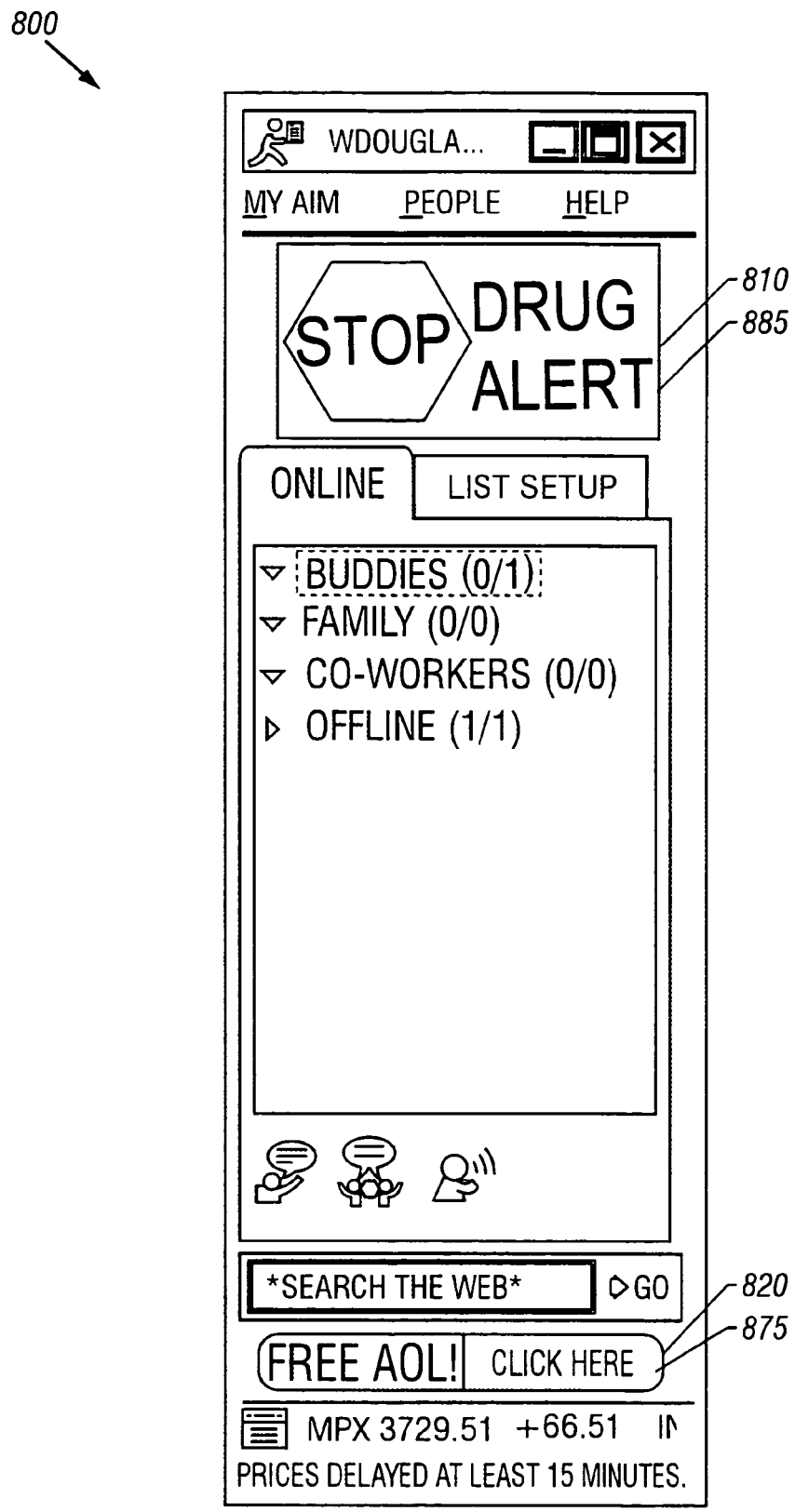
Figure 12:
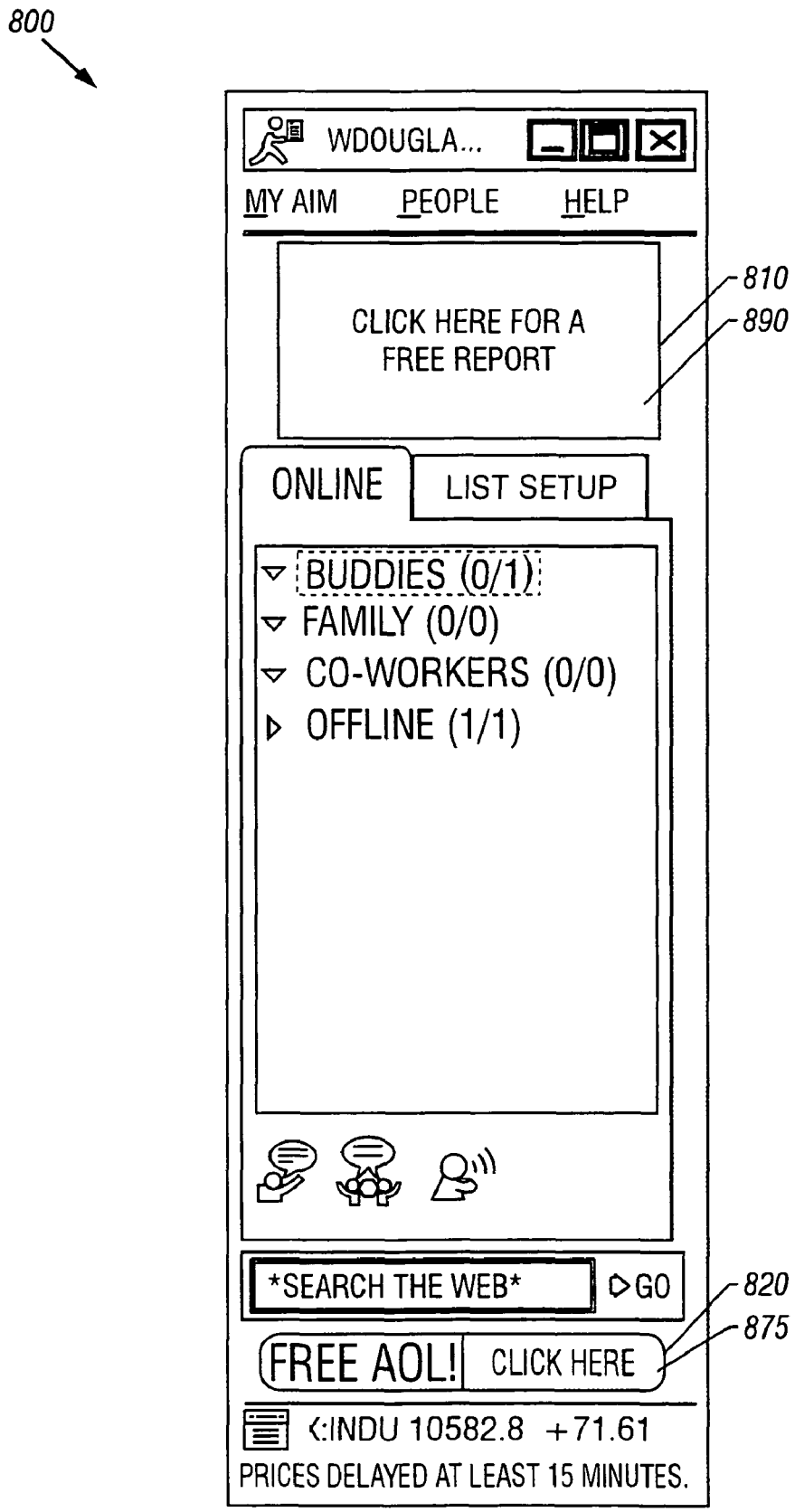

As illustrated in FIG. 11, the upper advertising hot spot 810 changes to an ad 885 while the lower advertising hot spot 820 continues to display the ad 875. As illustrated in FIG. 12, the upper advertising hot spot 810 then can change to an ad 890, which is an ad that is related to the ad 885. Although the ads 885 and 890 are not animated, there is a rapid flipping of the related ads 885 and 890.

As discussed in more detail below, a portion of the system 800 controls ad timing access and considers system idle time information. In this manner, the timing of ad transitions can be tied to what the user is doing in a particular application that has ads displayed. For example, the timing of an ad transition can be based on the user idle time with respect to the system idle time rather than the application idle time. This is useful because the user may be idle in one application but active in another.

Figure 13:
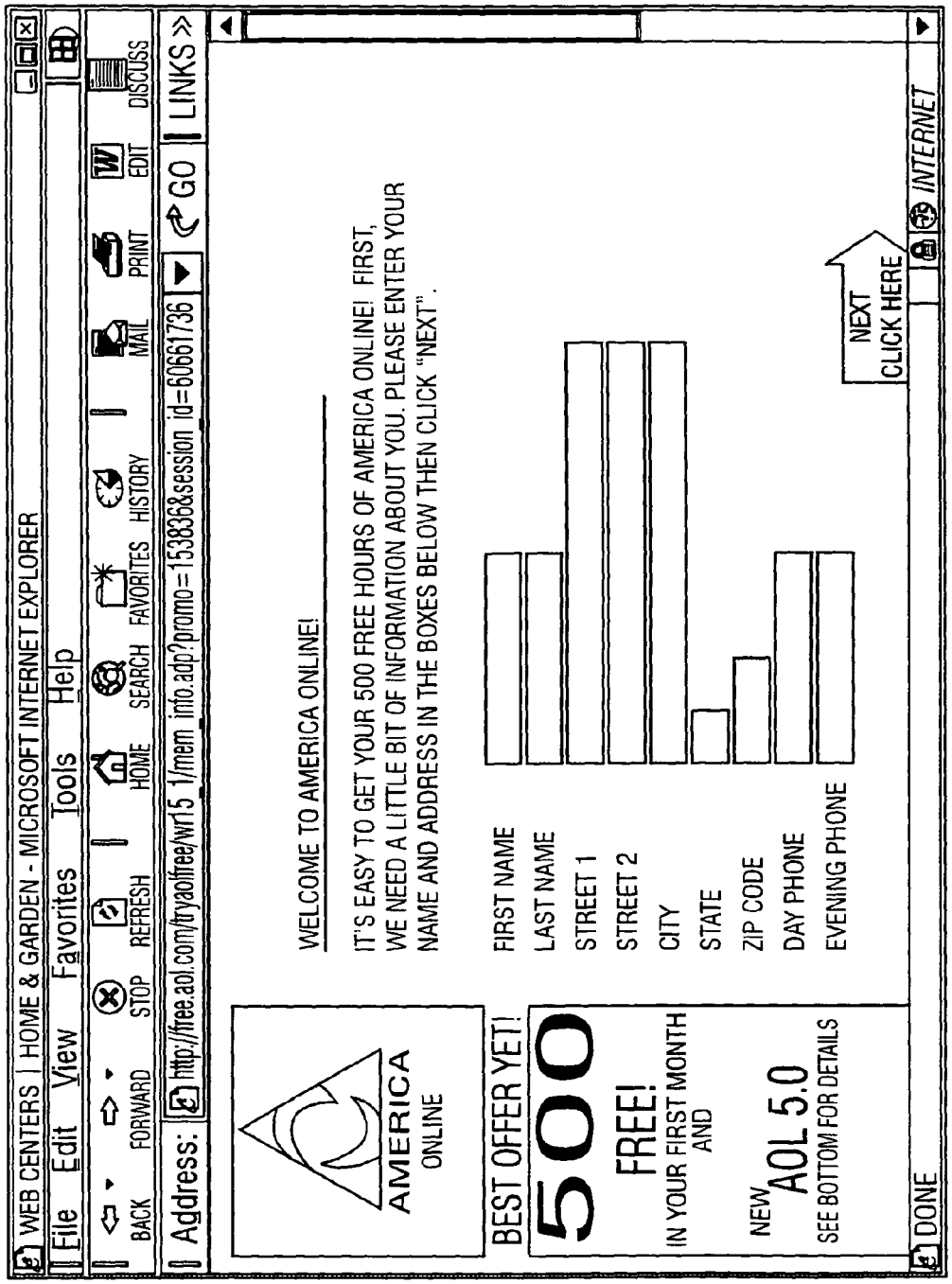
FIG. 13 is a screenshot of a web site directed to an ad.

By changing the ads at different times, there is an enhanced likelihood that an ad will catch a user's attention and cause the user to click on the ad. Clicking on the ad 870, for example, causes a linked page 900 to be displayed in the user's web browser window, as shown in FIG. 13.

Clicking on an ad hot spot to gain access to the underlying ad content is referred to as a "click through." The rate at which users click on an ad to go to the linked ad is known as the click-through rate. Typically, click-through rates are reported as a percentage of impressions. For example, two click-throughs per hundred impressions is a click-through rate of two percent.

The click-through rate can be measured and reported for different entities, such as a service, an ad, a web site, a technique of displaying ads, a user, or a category of users. For example, if an ad is particularly eye-catching in comparison to other ads, it is likely to have a greater click-through rate than other, less eye-catching ads. Likewise, if a service or a web site displays ads in a prominent portion of the screen, the ads displayed in that portion of the screen are likely to have a greater click-through rate than other, less prominently displayed ads on the same screen. Techniques and systems for displaying ads, such as by timing the display of ads based on activity of the user, can increase the click-through rate for ads in comparison to ads that are not timed. With respect to timing, statistics can be generated regarding the likelihood of click through relative to, for example, the amount of time that an ad is displayed or the amount of time that the user is idle before the ad is displayed. These statistics can be used to control ad timing in ways that improve click-through rates. In general, if an ad system operator can show an advertiser that displaying an ad on the ad system will cause that ad to have an increased click-through rate, for whatever reason, as compared to another ad system, the ad system operator with the increased click-through rate likely will be able to sell impressions at a premium CPM.

To attract and retain a user's attention in a way that improves the click-through rate, the timing and rate at which ads displayed in advertising hot spots, such as hot spots 810 and 812 of FIGS. 8-12, can be varied according to one or more tuning parameters. Tuning parameters include ad expiration, maximum display count, minimum display time, idle delay, active delay, and idle (no spin), all of which are described below. The tuning parameters can be determined and specified by the ad system operator, the advertiser, or both, to increase the click-through rate. The tuning parameters set the rate at which ads are changed and/or under what conditions they are changed. Typically, tuning parameters are used to cause the display of an ad to be replaced by the display of another ad based on a user's activity with respect to the user's computer. A set of tuning parameters can be specific to an ad, to an advertiser, or to all of the ads displayed on a particular page or screen. The parameters can be optimized, as described below, to improve the effectiveness of a marketing campaign using advertising on the Internet or on another computer network or service.

Tuning parameters may be associated with ads displayed on an instant messaging program screen, or other service, and may be downloaded with the ads in batches. Software supporting the service at the user's system ("client software") may periodically contact the ad server and download a batch of ads and their associated tuning parameters, where each ad has an associated tuning parameter. For example, the client software may contact the ad server every twenty minutes.

"Ad expiration" refers to the quantity of time for which an ad is available for display. Once the expiration has passed, the ad will no longer be displayed. Typically, the expiration is set for a period of time greater than the frequency with which the client software requests new ads from the server. In this manner, the expiration is a backstop to overcome potential problems resulting from the client software not being able to connect to the ad server, due, for example, to network problems. Should such a case arise, the client software will continue to display the last batch of ads until the problem is solved, or the expiration times of the ads are exceeded. Once the expiration times of all of the available ads have been exceeded, the client software will stop showing ads until contact with the server is reestablished. This ensures advertisers that they will not be billed for ads outside of their contract period. In one example of ad expiration, a particular ad may have its expiration set on the basis of a relative clock, such as for 1 hour, while the frequency of client connection with the ad server is 20 minutes. In this example, the ad will not be displayed in the period beginning one hour after the ad has been downloaded to the client. In another example of ad expiration, a particular ad may have its expiration set to an absolute clock, such as 2 P.M. In this example, the ad will not be displayed after 2 P.M. An absolute ad expiration clock is advantageous when the ad relates to an event that is time sensitive, such as an ad for a sporting event.

"Maximum display count" refers to the maximum number of impressions of a given ad that may be displayed to any one user in one batch of ads. Because ads are sold on a CPM basis, the maximum display count typically is based on the number of impressions purchased and the time period between batches. Thus, if the purchaser of the advertising wants to spread the advertising over a set period, the maximum display count can be specified so that the advertising does not occur in a concentrated portion of that set period. For example, if a company purchases 10,000 impressions and wants to spread the impressions over ten days, the target impressions per day is specified for a subset of the overall time period, e.g., no more than 1,000 impressions per day for each of the ten days. The maximum display count also may be specified by the ad system operator to prevent the display of more impressions than were purchased.

In general, the ad system operator or host has an approximate estimate of how many impressions overall per day will be generated by the ad system screen, such as the screen of an instant message program. The operator or host can use that knowledge to determine how many impressions can be sold. Typically, the distribution of impressions across the ads that are scheduled to run on a given day is done using weighing factors. Thus, if the operator expects to have 10,000 impressions in a day, and has sold 5,000 impressions to one advertiser X and 3,000 impressions to another advertiser Y, leaving 2,000 spare impressions for its own ad Z, the operator may assign the ads proportional weights. These values then define the order in which the ads will be served and the frequency at which each will be served within a batch. Assuming that the operator typically displays twenty ads in a batch, the weights would be used to calculate the 0.5 maximum display count for each ad. For example, assuming a 20 minute ad batch and approximately one ad per minute, the maximum display count for advertisers X, Y, and Z would be 10, 6, and 4, respectively. This allows the operator to specify the mix of ads to be shown within one batch, while it may not attempt to manage the number of impressions delivered to each advertiser across batches. Thus, if the operator's forecasts are incorrect and there are fewer impressions than expected, all of the advertisers will under perform in proportion to their weight. Similarly, if there are more impressions than expected, the advertisers will over perform in proportion to their weight.

"Minimum display time" refers to the minimum amount of time that an ad must be displayed before another ad is displayed. The values for minimum display time are expressed in seconds, and typically vary between fifteen seconds and five minutes. When an ad is displayed, the ad will stay displayed for its minimum display time. When that time has elapsed, the ad will be rotated out and replaced by another ad, subject to the idle parameter described below. For example, if the minimum display time is set at fifteen seconds, the ad will be displayed for at least fifteen seconds before another ad is displayed. The minimum display time is set lower than the ad expiration time. The minimum display time prevents "ad-idle-ad" situations in which the second occurrence of the ad is only for a fleeting moment.

"Idle delay" designates the time to wait after a user has become "idle" before replacing an ad with another ad. The term "idle" is used to describe the condition in which the user is not interacting with the computer through, for example, either the mouse, the keyboard, or another device that sends, or causes to be sent, an input signal to the computer. If there is a conflict between the ad expiration timing and the idle delay the idle delay, takes priority over the ad expiration timing. The premise of "idle delay" is that shortly after a user has gone idle, the user is most likely to look at the introduction of a new ad. Idle delays may vary between animated ads and normal (non-animated ads) to account for differences in the likelihoods that the viewer has become idle because the user is viewing the ad.

"Active delay" designates the time to wait after a user has become active before rotating in a new ad. The premise of active delay is to provide time for the user to click on the old ad before rotating in the new ad. Without this feature, for example, if a user becomes active after being idle, a new ad may rotate in immediately. This could result in a problem situation in which a user wants to click on an ad, but movement of the mouse toward the ad causes the user to become active, which replaces the ad with a new ad and frustrates the user.

"Idle (no spin)" designates a period of time after a user goes idle to stop changing the ads. The premise of "idle (no spin)" is that the user is unlikely to view ads displayed on a computer monitor after the user has been idle for a specified period of time (e.g., five minutes).

The timing of the change of ads displayed in screen real estate areas can be controlled by the tuning parameters described above. The tuning parameters can be implemented, for example, to cause an ad to be displayed for a specified period after the user has gone idle before the ad is replaced with another ad. The advertiser benefits from such timing based on the premise that the user is more likely to notice an ad shortly after going idle than when the user is active. Delaying the display of an ad so that it appears shortly after the screen's content is updated draws more attention to the ad and increases the likelihood that a user will click on the ad.

Figure 14:
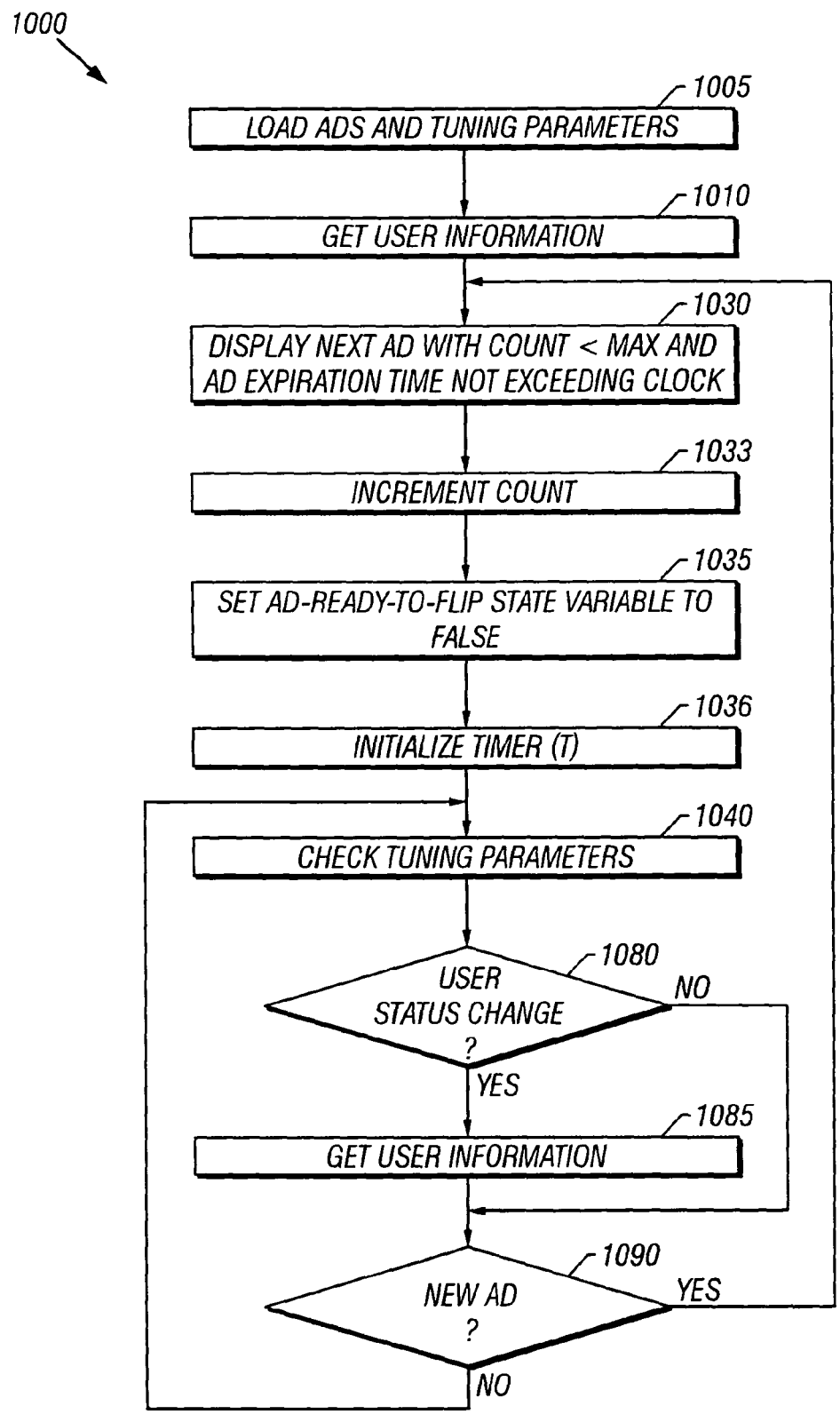
FIGS. 14-16 are flowcharts showing a decision-making process to determine if the display of an ad should be replaced by the display of another ad.
Figure 15:
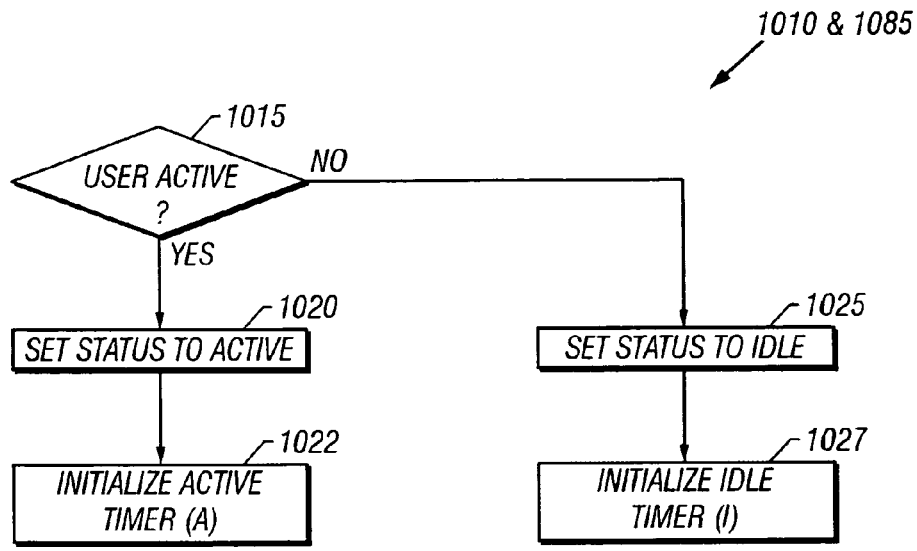
Figure 16:
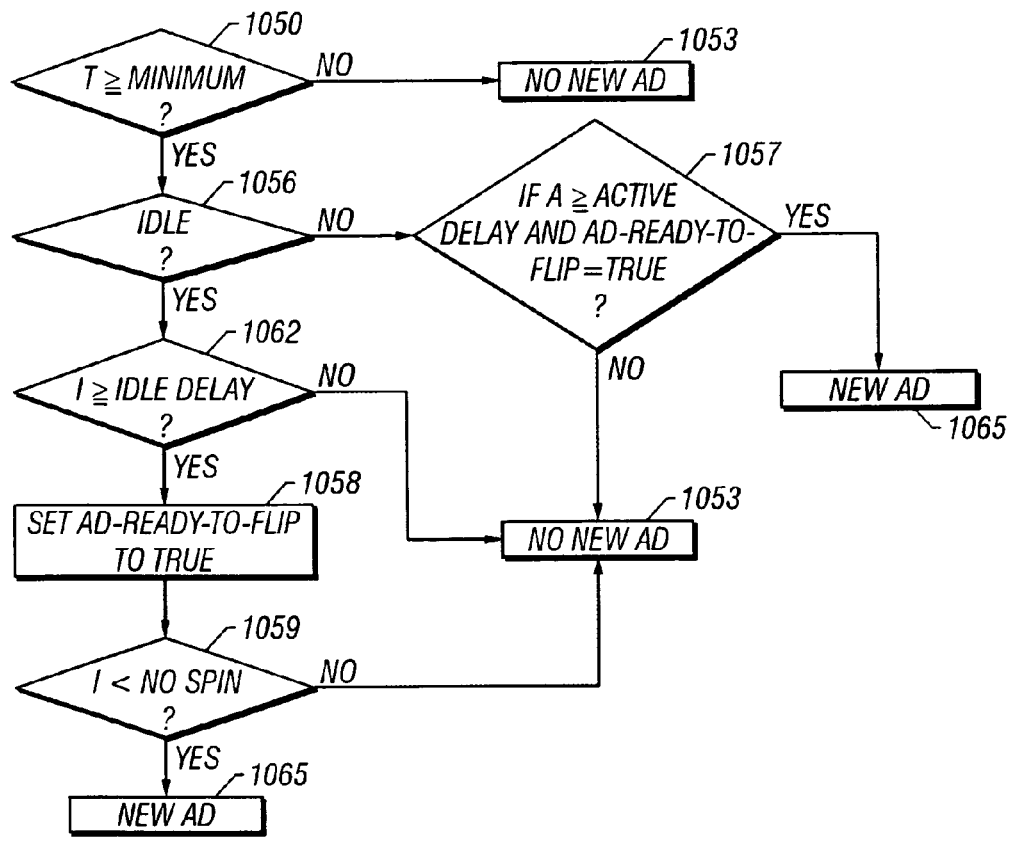

Referring to FIGS. 14-16, the relative priority between the individual parameters can be varied to affect the outcome of any set of conditions. For example, as illustrated in FIG. 14, the client software of an instant messaging service may use tuning parameters according to a procedure 1000. Initially, the client software downloads a batch of ads and tuning parameters to the user's computer (step 1005). Tuning parameters may be associated with individual ads, with groups of ads, or with the entire batch of ads. The client software may download the ads and tuning parameters when the user signs on to the instant messaging service. The client software then obtains user information (step 1010). This information includes whether the user is active or idle.

As illustrated in FIG. 15, in obtaining the user information (step 1010), the client software first determines whether the user is active (step 1015). If the user is active, the client software sets a status variable to active (step 1020) and initializes a user active timer (A) (step 1022). Otherwise, the client software sets the status variable to idle (step 1025). The client software then initializes a user idle timer (I) (step 1027) and returns to the procedure 1000. The client software then displays a first ad that has a count less than the maximum and an ad expiration time that has not exceeded either a relative clock (e.g., 1 hour) or an absolute clock (e.g., 2 PM) (step 1030), increments the count for that ad (step 1033), sets a state variable "ad-ready-to-flip" to false (step 1035), and initializes a timer (T) for that ad (step 1036). The client software then checks the tuning parameters (step 1040). The state variable, "ad-ready-to-flip" is used to ensure that the user has been idle before the allowing the ad to be flipped. As described below, the idle/active status of the user is periodically checked and, when the user is found to be idle, the state variable is changed to true.

As illustrated in FIG. 16, in checking the tuning parameters (step 1040), the client software initially determines whether the timer (T) is less than the minimum display time tuning parameter (step 1050). If the timer is less than the minimum display time, the client software determines that no new ad is to be displayed (step 1053) and checks no other tuning parameters.

If the timer is greater than or equal to the minimum display time, the client software determines whether the user is idle (step 1056). If the user is not idle, the client software determines whether the active timer A is greater than or equal to the active delay and whether the state variable "ad-ready-to-flip" is set to true (step 1057). If these two conditions are not met, the client software determines that no new ad is to be displayed (step 1053) and checks no other tuning parameters. (In the described implementation, ads can only be changed after a user has been idle. In an implementation in which an ad could be changed when the user is active, without having been idle, the client software would check the active delay tuning parameters.) If these two conditions are met, the client software determines that a new ad should be displayed (step 1065).

If the user is idle, the client software determines whether the user has been idle for more than the idle delay tuning parameter (i.e., I is greater than or equal to the idle delay parameter) (step 1062). If the timer (I) is less than the idle delay tuning parameter, the client software determines that no new ad is to be displayed (step 1053) and checks no further tuning parameters.

If the timer (I) is greater than or equal to the idle delay tuning parameter, the client software sets the "ad-ready-to-flip" state variable to true (step 1058) and determines whether the user has been idle for less than the no spin parameter (step 1059). If the timer (I) is greater than or equal to the no spin tuning parameter (step 1059) the client determines that no new ad is to be displayed (step 1053). If the user has been idle for less than the no spin parameter (step 1059), the client software determines that a new ad is to be displayed (step 1065). The client software then returns to the procedure 1000.

Upon returning to the procedure 1000, the software determines whether there has been a change in the user's status (step 1080). If so, the software obtains user information (step 1085).

Next, the software determines whether a new ad should be displayed (step 1090). If a new ad should be displayed, the procedure loops back and displays the next unexpired ad that has a count less than the maximum display count tuning parameter (step 1030). If a new ad should not be displayed, the software loops back and checks the tuning parameters again (step 1040).

Figure 17:
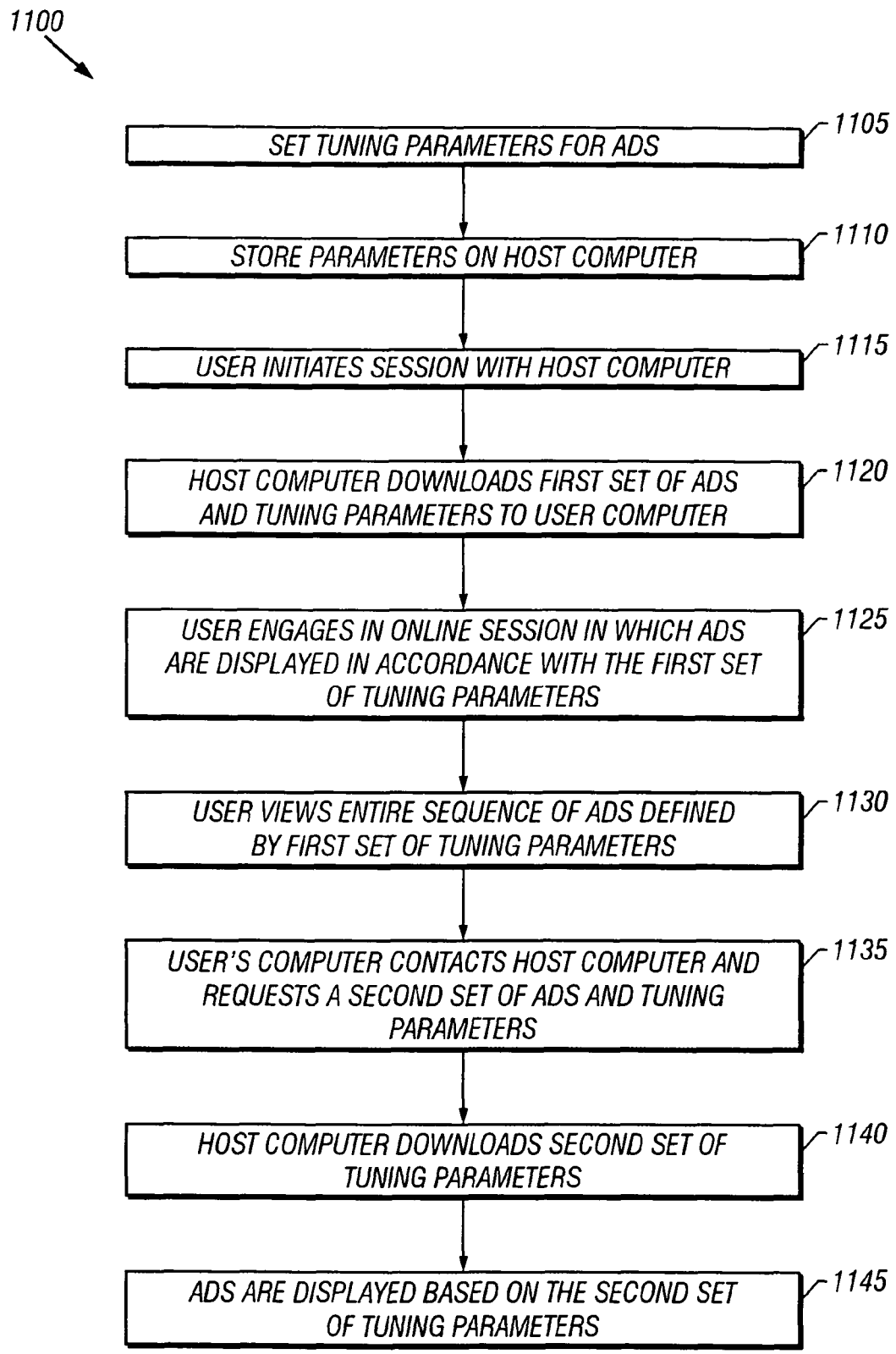
FIG. 17 is a flowchart showing an implementation of ad timing using tuning parameters to control the display of ads on a web page.

Referring to FIG. 17, ad timing techniques may be implemented on a user's computer according to a procedure 1100. The procedure 1100 includes setting the specified tuning parameters, downloading a set of parameters to a user's computer and, when necessary, downloading another set of parameters to the user's computer. Different aspects of the procedure may be implemented by different entities, such as the advertisers, the ad system operator and the user's computer.

Typically, after an agreement has been reached between an advertiser and an advertising system operator, the operator determines and sets the appropriate tuning parameters for the ads (step 1105). This may be done, for example, by entering the parameters into a database of tuning parameters corresponding to ads. These tuning parameters then are stored on the host computer (e.g., the computer acting as the server for an instant messaging system) (step 1110). When a user initiates an online session with the host computer (step 1115), the host computer downloads a first set of ads and associated stored tuning parameters to the user's computer (step 1120). As the user takes part in the online session, the ads are displayed in accordance with the first set of tuning parameters (step 1125). If the user is online for a sufficient period, and/or the entire sequence of ads defined by the first set of tuning parameters is viewed (step 1130), the user's computer contacts the host computer and requests a second set of ads and tuning parameters (step 1135). The new ads and tuning parameters are downloaded to the user's computer (step 1140), which then causes ads to be displayed in accordance with the second set of parameters (step 1145).

As an example of a set of tuning parameters, assume that an ad system operator has received orders from three advertisers that wish to advertise on a screen of that ad system operator, and that only one user views that screen. The advertisers will have paid for a specific number of impressions and the ad system operator will determine and specify the tuning parameters to provide optimal effectiveness of the ads. In this example, Advertiser #1 has paid for 1,000 normal (i.e., static) impressions over 10 days at a rate of 100 impressions per day. Advertiser #2 has paid for 2,000 animated impressions over two days at a rate of 1,000 impressions per day. Advertiser #3 has paid for 900 normal impressions over one day. Referring to Table I, the ad system operator might create the tuning parameters shown to specify how sequencing between ads will be controlled. First, the maximum display counts are set to be 1, 10, and 9, respectively. The ad expiration parameter is set to ten days, two days, and one day, respectively, for the three ads. The minimum display time is set at one minute for each ad, and the idle delay is set at two seconds for each ad. The active delay typically also is set at two seconds. The idle (no spin) typically is set at a value of approximately five minutes. In general, in this example, the main value that varies between ads is the maximum display count, though other values can also vary.

TABLE I

|  | Maximum Display Count | Ad Expiration | Minimum Display Time | Idle Delay | Active Delay | Idle (No Spin) |
| --- | --- | --- | --- | --- | --- | --- |
| Advertiser #1 | 1 | 10 days | 1 minute | 2 seconds | 2 seconds | 5 minutes |
| Advertiser #2 | 10 | 2 days | 1 minute | 2 seconds | 2 seconds | 5 minutes |
| Advertiser #3 | 9 | 1 day | 1 minute | 2 seconds | 2 seconds | 5 minutes |

Based on the tuning parameters selected for the ad displayed for Advertiser #1, the ad will be displayed one time in each 20 minute batch. Each time it is displayed, the ad will be displayed for at least one minute before it is replaced with one of the other two ads. Based on the setting of the idle delay parameter, the ad will not be replaced until the user has been idle for two seconds. The idle delay parameter benefits the advertiser based on the premise that the user is more likely to notice an ad shortly after going idle than when the user is active.

If the user is not viewing the ad, because, for example, the ad is minimized or occluded or if the user is idle, the active delay parameter causes an ad rotation to be delayed until two seconds after the user returns to being active. In this manner, the ad will be displayed on the screen two seconds after the user has gone active. For example, the user may have received a telephone call and consequently is not viewing the screen or using the computer, which may cause a screen saver to be displayed on the screen. When the user reverts to being active, as evidenced by moving the mouse or using the keyboard, the screen saver is replaced by the previously-viewed screen. The ad then is displayed two seconds after that screen is displayed. This allows the user two seconds to click on the ad before the ad is replaced by another ad. Because the idle (no spin) tuning parameter for Advertiser #1 is set at 5 minutes, ad of Advertiser #1 will not be displayed after five minutes of idle time has passed. This parameter is set to avoid providing impressions on a screen that potentially is not being viewed by the user, as evidenced by the lack of user interaction with the computer.

As shown in FIG. 17, the ads in the sequence defined by the first set of tuning parameters are displayed until all of the ads have been displayed (step 1130). As illustrated in FIG. 14, ads are replaced by other ads according to the procedure 1000. It should be noted that an actual implementation would include significantly more than three ads in each batch. This helps to ensure that the user sees some variety and that the system does not degenerate into displaying just one or two ads over and over again.

Figure 18:
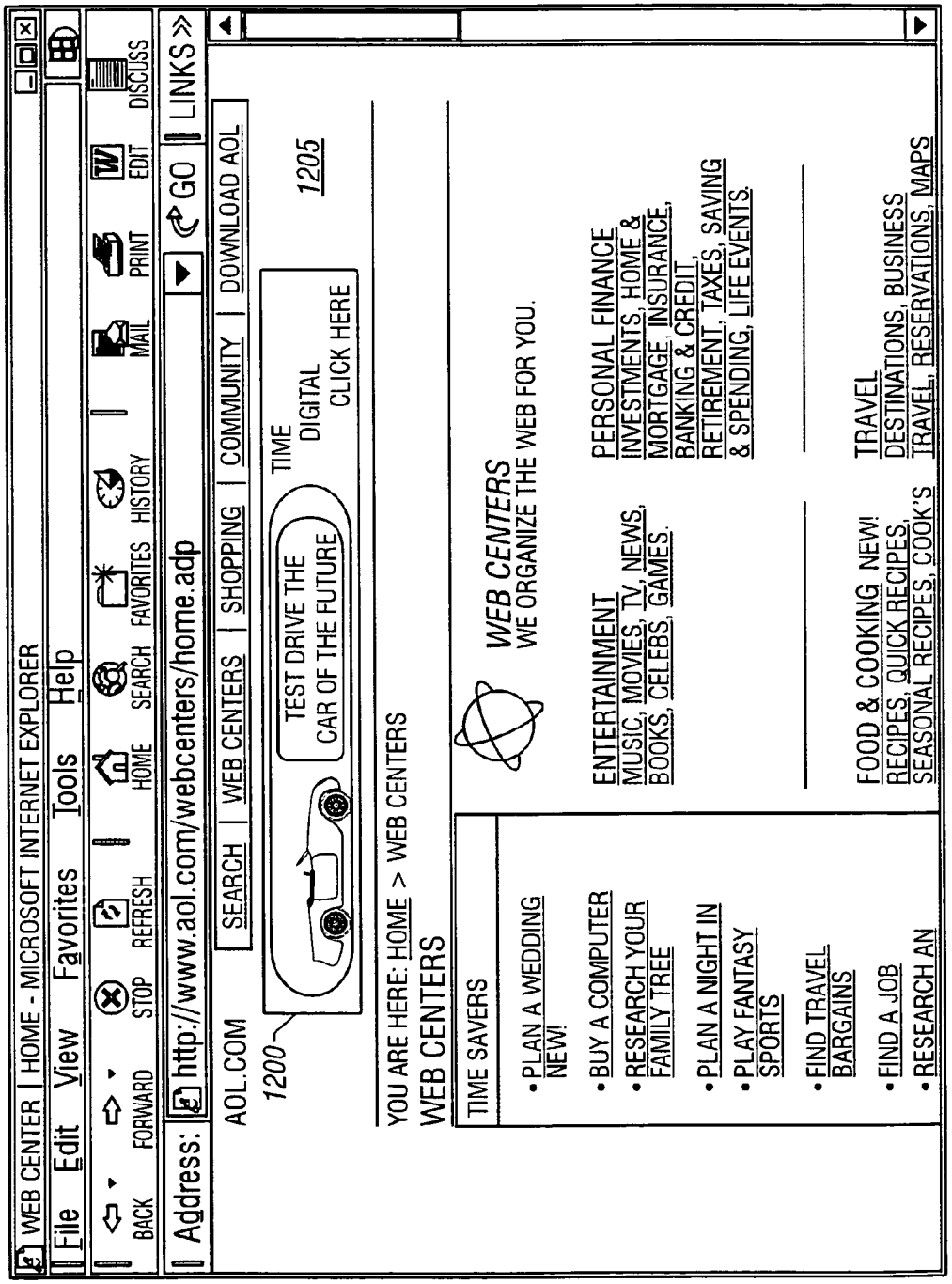
FIGS. 18-21 are screenshots of a web page at successive points in time showing an ad having multiple impressions and an animated ad.
Figure 19:
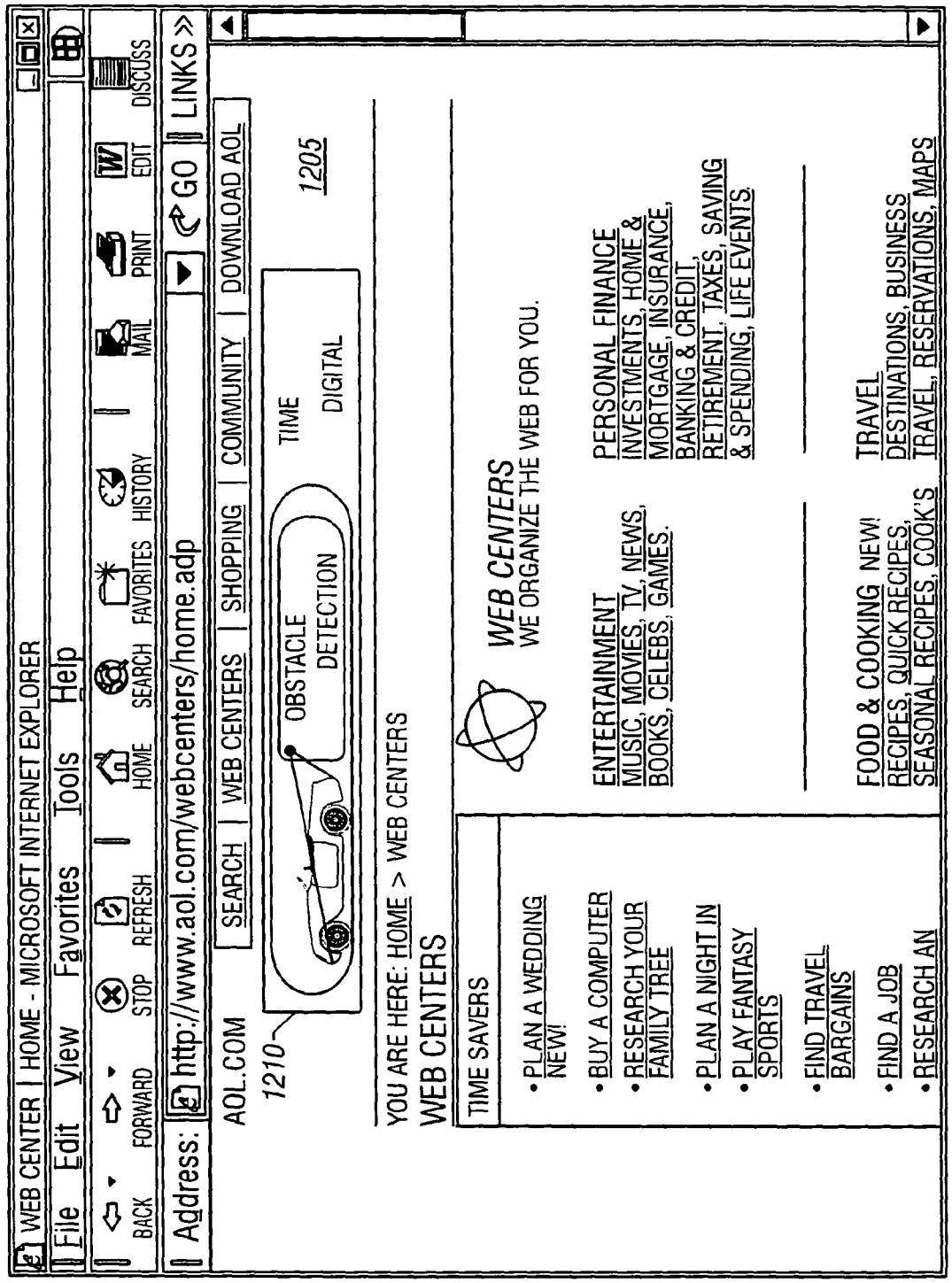
Figure 20:
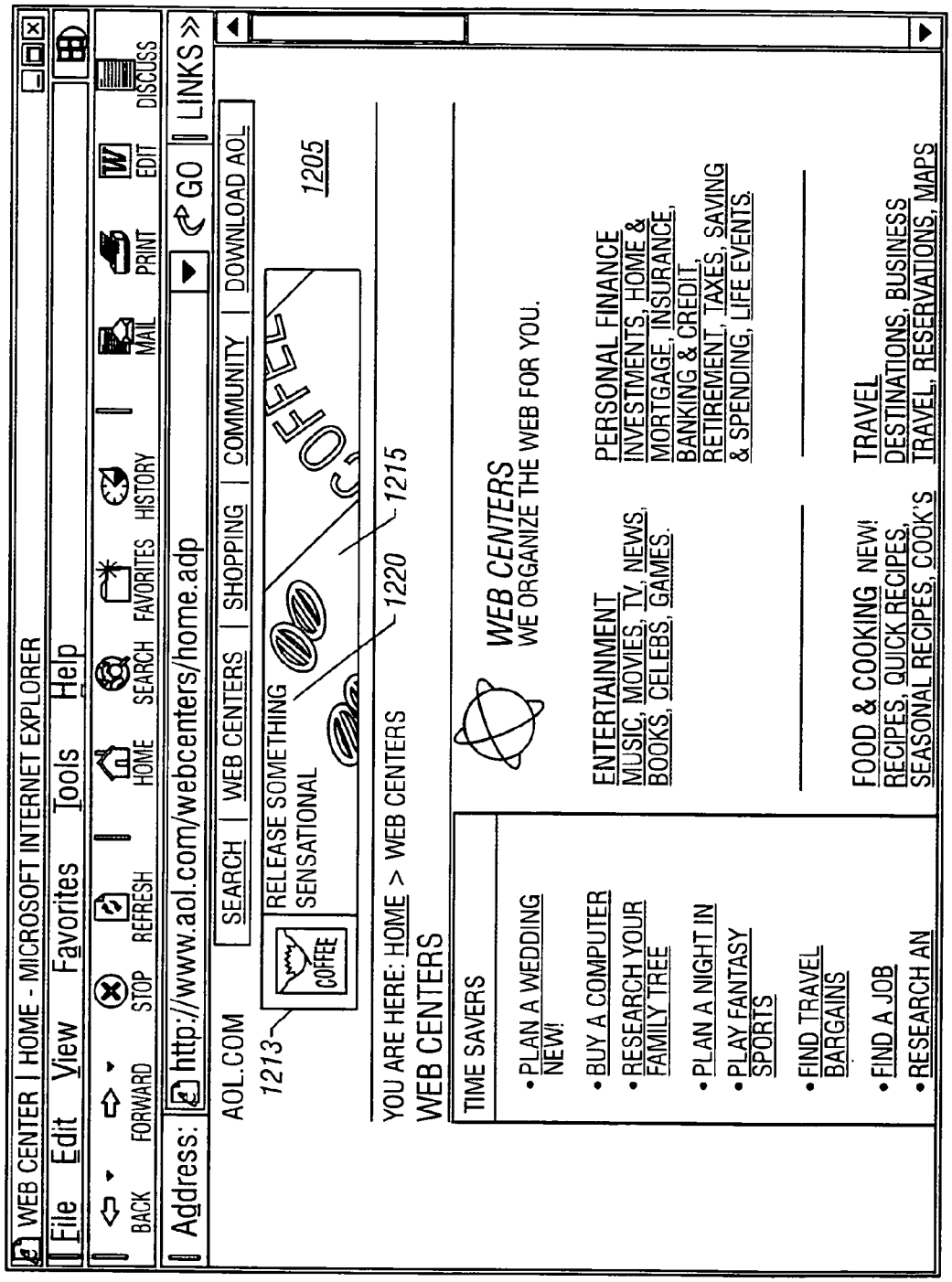
Figure 21:
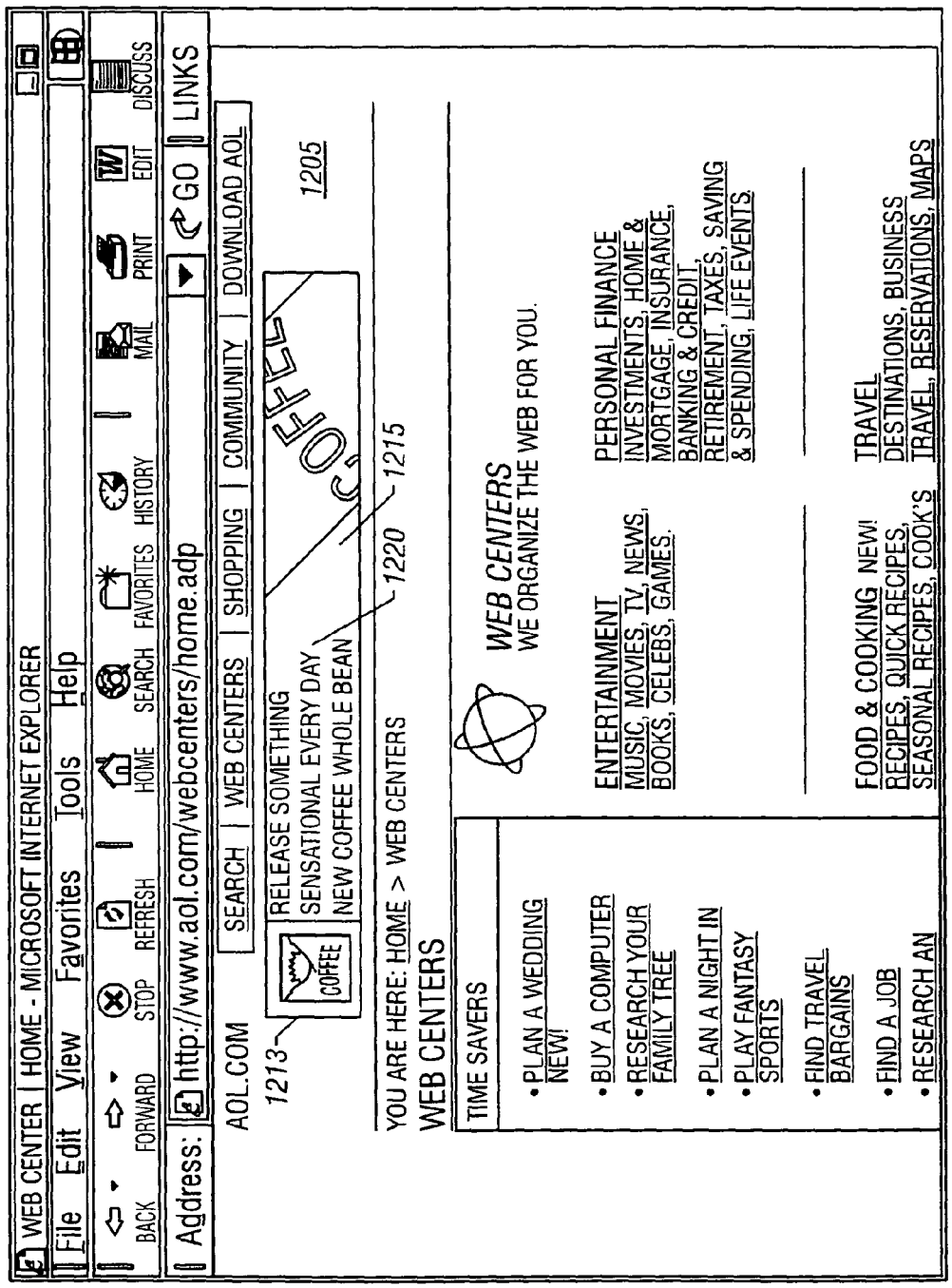

To provide specific examples of the decision making process 1000, FIGS. 18-21 illustrate a sequential display of three ads, including two ads of Advertiser #1 and an animated ad of Advertiser #2, for which tuning parameters are provided in Table II. The screen shot illustrated in FIG. 18 of the banner ad 1200 of Advertiser #1 on a web page 1205 may be preceded by a number of conditions relevant to the tuning parameters of Table II and display of the ad. For example, the user's computer may be in the idle condition or the user may have minimized the screen displaying web page 1205. From these conditions, by pressing the keyboard, moving the mouse, speaking into a microphone, or otherwise maximizing that web page screen, the display goes to the active mode. Once the screen display is in the active mode, there will be a subsequent delay of two seconds before the banner ad 1200 is displayed, based upon the "active display" tuning parameter of two seconds, as listed in Table II. Specifically, FIG. 18 illustrates the condition in which the two seconds delay has occurred and the banner ad 1200 subsequently has been displayed. The ad 1200 will be displayed for at least five seconds (i.e., the minimum display time for the ad from Table II), after which a related ad 1210 of FIG. 19 will be displayed on web page 1205. That ad will be displayed for at least five seconds (i.e., the minimum display time for the ad from Table II) before displaying another ad, animated ad 1213, of FIGS. 20 and 21. FIGS. 20 and 21 illustrate the use of tuning parameters to display animated ad 1213 that includes an area 1215 that includes animated text and object 1220. The change in displays in FIGS. 18-21 are based on the decision making process 1000 illustrated in FIG. 14.

TABLE II

|  | Maximum Display Count | Ad Expiration | Minimum Display Time | Idle Delay (Normal) | Active Delay | Idle (No Spin) |
|---|---|---|---|---|---|---|
| Advertiser #1 (Ad 1200) | 5 | 1 day | 1 minute | 5 seconds | 2 second | 5 minutes |
| Advertiser #1 (Ad 1210) | 5 | 1 day | 1 minute | 5 seconds | 2 second | 5 minutes |
| Advertiser #2 (Ad 1213) | 5 | 1 day | 90 seconds | 10 seconds | 4 seconds | 5 minutes |

Figure 22:
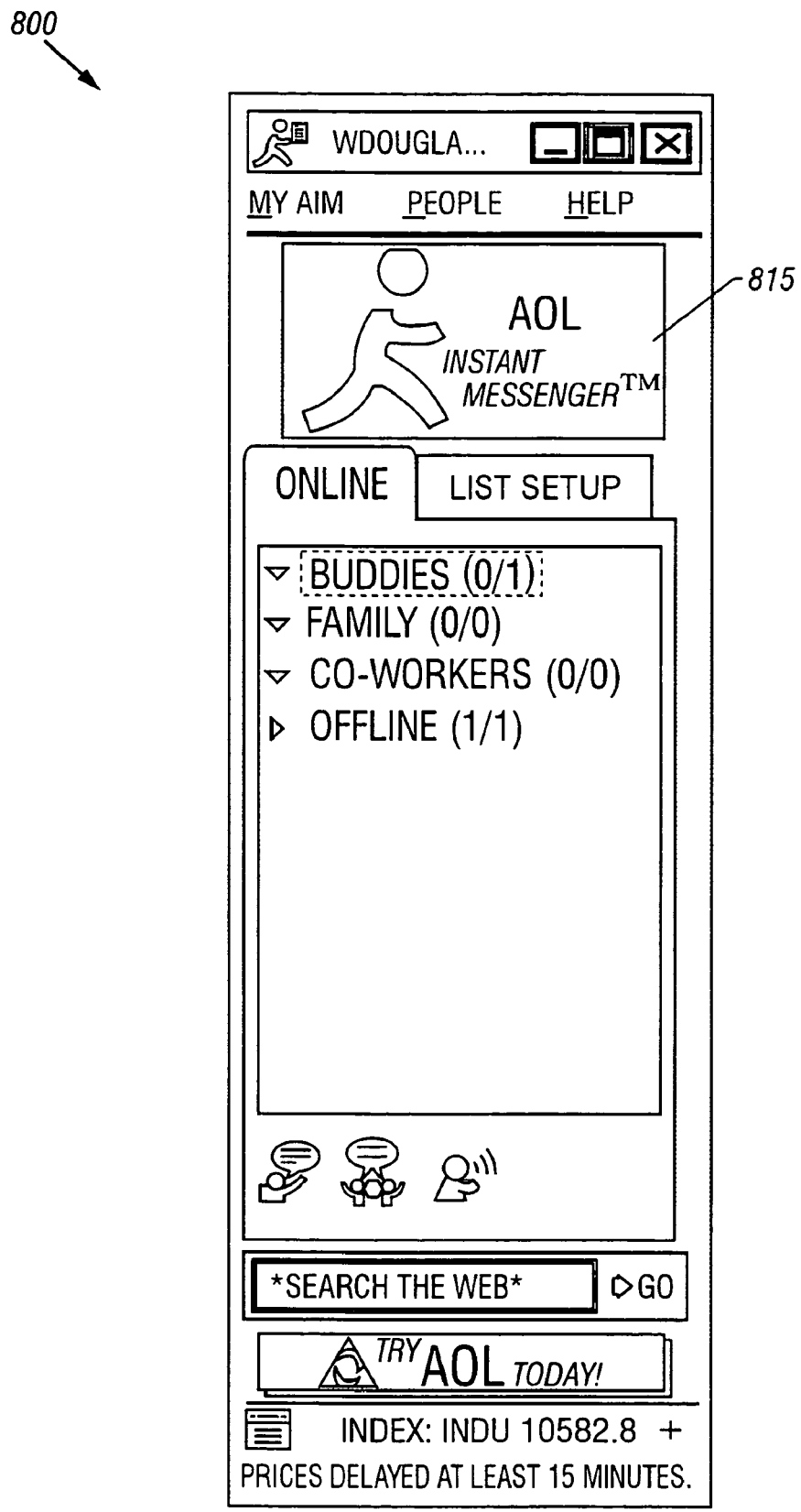
FIGS. 22 and 23 are screenshots of an instant messaging system at successive points in time showing an ad having multiple impressions.
Figure 23:
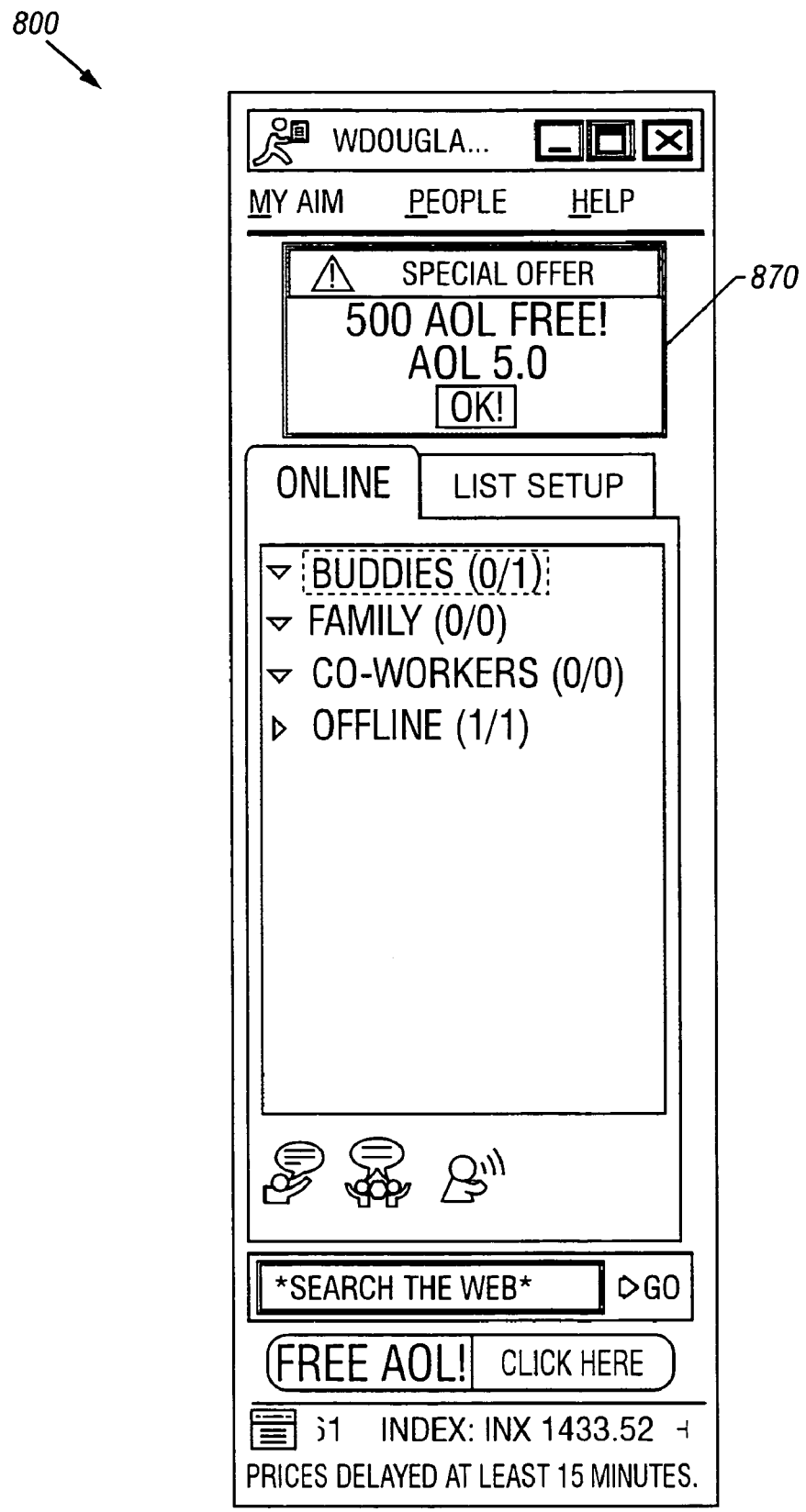

Referring to FIGS. 22 and 23, in another implementation of tuning parameters the decision making process 1000 is applied to the instant messaging service 800 (see FIGS. 8-12) using the tuning parameter listed in Table III. For ease of explanation, only two ads, the ad 815 and the ad 870, are discussed. In an actual implementation, more than two ads could be sequentially displayed.

TABLE III

|  | Maximum Display Count | Ad Expiration | Minimum Display Time | Idle Delay | Active Delay | Idle (No Spin) |
|---|---|---|---|---|---|---|
| Ad 815 | 5 | 2 days | 3 minutes | 2 seconds | 2 seconds | 5 minutes |
| Ad 870 | 10 | 2 days | 4 minutes | 2 seconds | 2 seconds | 5 minutes |

The tuning parameters listed in Table III are used to control the display of the ads 815, 870. As discussed above with respect to FIGS. 18-21, the display of the non-animated ad 815 may be preceded by a number of conditions relevant to the procedure 1000 (FIG. 14) and to the tuning parameters of Table III. For example, the ads and tuning parameters have been loaded (step 1005), user information obtained (step 1010), an ad displayed with a count less than the maximum display count (step 1030), the count incremented (step 1033), and the timer (T) initialized. The next event in the procedure 1000 that occurs is to check the tuning parameters (step 1040). Assume that the user has just gone idle after the ad 815 has been displayed for at least 180 seconds (i.e., a period greater than the minimum display time of Table III). The client software will first determine whether the ad 815 has been displayed for a period greater than the minimum display time (step 1050). Assuming that the ad has been displayed for that period, the client software will then determine whether the user is idle (step 1056). Assuming that the user is idle, the client software next determines whether the timer (I) is less than the no spin tuning parameter (step 1059).

If the timer (T) is greater than the no spin tuning parameter, the client software determines whether the timer is greater than the expiration tuning parameter (step 1068). If the timer is greater than the expiration tuning parameter, the ad is cleared (step 1071) and the client software determines that no new ad is to be displayed (step 1053) and returns to the procedure 1000.

If the user has been idle for less than the no spin tuning parameter, the client software determines whether the idle timer (I) is greater than the idle delay tuning parameter (step 1062). Assuming that the timer (I) has exceeded the idle delay tuning parameter, a new ad (i.e., ad 870) is selected for display (step 1065) and the client software returns to the procedure 1000.

Upon returning to the procedure 1000, the software determines whether there has been a change in the user's status (step 1080). If so, the software obtains user information (step 1085). Next, the software determines whether a new ad should be displayed (step 1090). If a new ad should be displayed, the procedure loops back and displays the next ad that has a count less than the maximum display count tuning parameter (step 1030). If a new ad should not be displayed, the software loops back and checks the tuning parameters again (step 1040).

In general, the tuning parameters and their use described above can be applied to any form of computer-based advertising, such as web pages, web TV applications, and instant messaging services. Techniques using the tuning parameters provide substantially improved effectiveness when incorporated in client-based software (i.e., software that resides or is installed on the user's computer). Such software may be, for example, a browser, an instant messaging service, a web-based TV application, or an Internet provider's proprietary client-based software that is supplied to a user when signing up for Internet service from that provider. The tuning parameters are delivered to the client-based software from the host computer at the start of a session when the client's computer initially connects to the host's computer.

After the tuning parameters are delivered to the client's computer, the parameters implement the display of ads based on those parameters. Because the display of ads is influenced by the quantity of time during which the user is active or idle, or the screen is minimized, the ads will be viewed over a variable length of time. Conceivably, not all of the ads will be viewed during the user's connection to the host, or they all may be viewed during a first portion of the user's connection to the host. In the case of the latter, the user's computer will request that the host computer supply a new set of ads and associated tuning parameters. In this manner, the user's computer will be supplied a second set of ads and associated tuning parameters whenever the user has viewed the entire set of previous ads.

In general, each batch of ads and parameters is designed to be more than enough for the client software to show before the next batch of ads is fetched. In other words, the batches rarely run out before the 20 minute inter-batch interval has expired. Accordingly, sending a batch of ads to the client does not in and of itself generate impressions. It is the act of the client displaying the ads, in accordance with the parameters, that generates impressions. For this reason, the client reports back to the host on how many impressions and/or click-throughs have been generated. This allows the host to adjust the counts of how many ads need to be displayed, and to adjust the tuning parameters accordingly for future batches. The client reports these actual impression counts at two different times. First, when it goes to fetch a new batch of ads it reports the impressions that were generated since the last time it reported. Second, if the user clicks on an ad, the client reports on the impressions since the last report, and, of course, the click. In this manner, the advertiser is assured that the impressions purchased are delivered because the user's next connection to the host computer will include a set of ads and tuning parameters that are specified based on the number of ads viewed in the previous session. In addition, when the user logs out, information, such as the number of clicks and the impressions viewed by the user, is returned to the host computer.

In addition to notifying the host computer of the quantity of impressions provided, the user's computer provides information about the clicks the user has made. When a user clicks through an ad, that information is recorded and provided to the host computer, and can be used to analyze the effectiveness of an ad as well as the tuning parameters specified for the ad. For example, a matrix of tuning parameters can be selected and correlated to click-through rate to determine the most effective tuning parameters with respect to a particular user, classes of users, users in general, or for a format of advertising.

Figure 24:
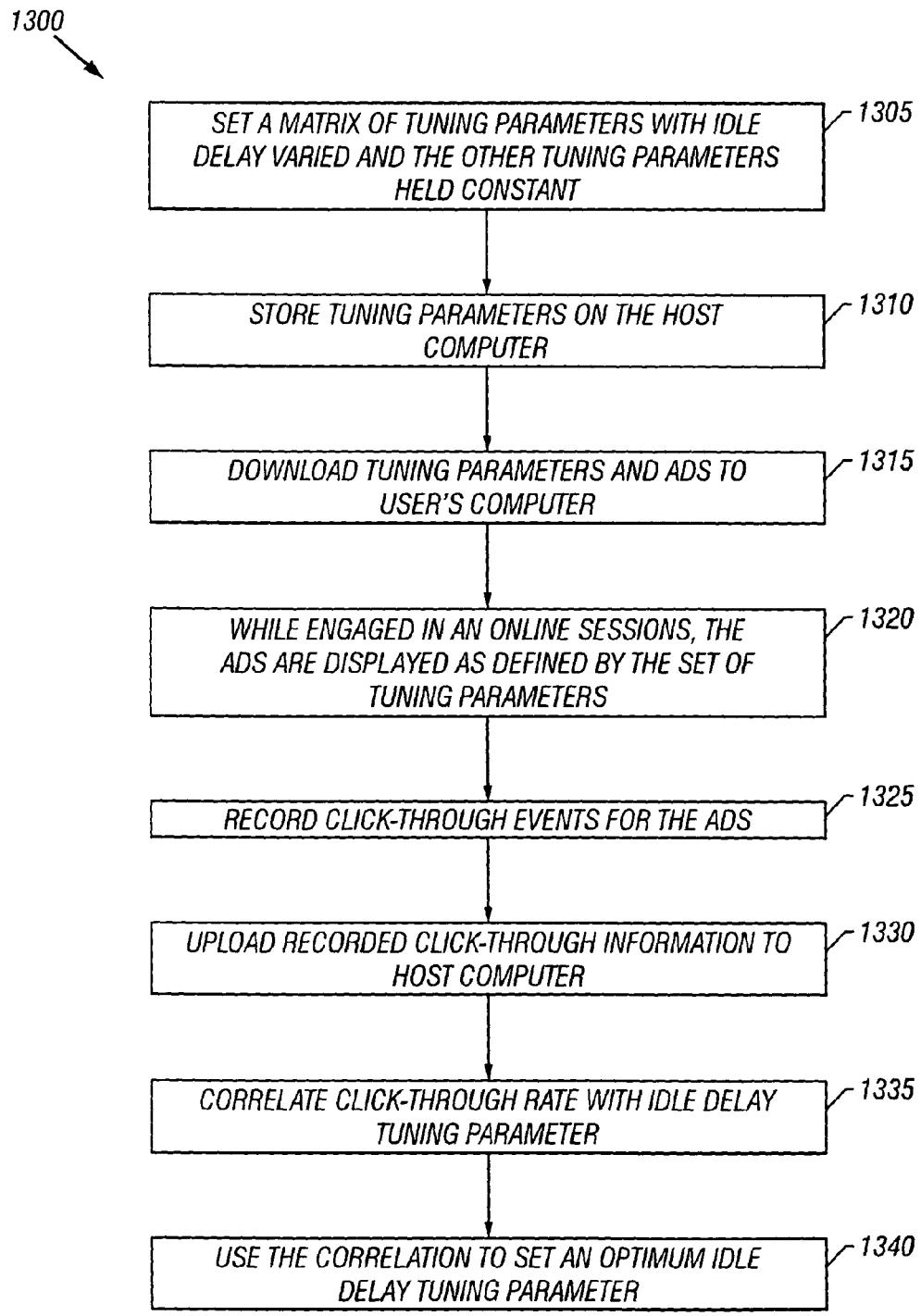
FIG. 24 is a flowchart showing a decision-making process to determine optimum tuning parameters.

Each tuning parameter, or a combination of tuning parameters, can be optimized with respect to click-through rate by using standard optimization methods. This may be done, for example, according to the procedure 1300 illustrated in FIG. 24. According to the procedure 1300, to optimize, for example, the idle delay tuning parameter, the idle delay tuning parameters for a group of ads can be set to vary, for example, between five, ten, fifteen, and twenty seconds with the remaining tuning parameters held constant (step 1305). The tuning parameters are stored on the host computer (step 1310) and downloaded to a user's computer (step 1315). While the user engages in an online session, the ads are displayed as defined by the set of tuning parameters (step 1320). Click-through events are recorded for the ads (step 1325) and uploaded to the host computer (step 1330). From this information, the click-through rate for the ads can be measured and correlated with the idle delay (step 1335). The host then uses the correlation to set an optimum idle delay time for individual users, classes of users, or users in general (step 1340). Similar optimizations can be performed for each tuning parameter. To determine the optimum tuning parameters for an advertising format, such as animated or non-animated, the tuning parameters can be varied for the format and correlated with click-through rate.

The techniques, methods and systems described here may find applicability in any computing or processing environment in which content is to be displayed to a viewer. In particular, the concept of varying the timing between displayed content transitions could be used whenever it is desirable to attract and/or retain the viewer's attention. For example, web page content other than, or in addition to, ads could be displayed with dynamically altered transition timing. As another example, the timing between displays of status indicators or warnings could be varied to engage an equipment operator such as a pilot or a nuclear plant operator. The timing also can be used in interactive software applications in which the user must interact with part of a screen or display. For example, installation software may use the techniques and methods described here to assist the user installing the software by varying the timing of interactive portions of the screen or portions that have key information that the user must notice and read.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially designed ASICs (application-specific integrated circuits).

A number of embodiments have been described. Nevertheless, it will be understood that various modifications may be made without departing from the spirit and scope of the invention. Accordingly, other embodiments are within the scope of the following claims.

What is claimed is:

1. A method of presenting advertising to viewers in a computer network environment, the method comprising: monitoring a viewer's interactions with an associated computer system; and based on the viewer's monitored interactions, varying a first amount of display time for which a later displayed advertisement is to be displayed on the viewer's associated computer system, the first amount of display time being different than a second amount of display time for which the later displayed advertisement is to be displayed on another viewer's associated computer system.

2. The method of claim 1, further comprising adjusting an ad expiration tuning parameter configured to set a quantity of time for which an advertisement is available for display.

3. The method of claim 1, further comprising adjusting a maximum display count configured to set a maximum number of times to display an advertisement to a user viewing a batch of ads.

4. The method of claim 1, wherein varying the first amount of display time for which the later displayed advertisement is displayed comprises adjusting a minimum display time configured to set a minimum amount of time to display the later displayed advertisement before another advertisement is displayed.

5. The method of claim 1, wherein further comprising adjusting an idle delay configured to cause a delay from the time a user has gone idle before a first advertisement is replaced with another advertisement.

6. The method of claim 1, further comprising adjusting an active delay configured to cause a delay from the time a user goes active before displaying another advertisement.

7. The method of claim 1, further comprising adjusting an idle (no spin) parameter configured to stop the display of a first advertisement from being replaced with the display of another advertisement after a user goes idle.

8. The method of claim 1, wherein monitoring the viewer's interactions with the associated computer system comprises monitoring a use of a computer mouse.

9. The method of claim 1, wherein monitoring the viewer's interactions with the associated computer system comprises monitoring a use of a computer keyboard.

10. The method of claim 1, wherein monitoring the viewer's interactions with the associated computer system comprises monitoring an auditory signal.

11. The method of claim 10, wherein the auditory signal is the viewer's voice.

12. The method of claim 1, wherein monitoring the viewer's interactions with the associated computer system comprises monitoring a maximization and a minimization status of a screen displaying advertising.

13. The method of claim 1, wherein monitoring the viewer's interactions with the associated computer system comprises monitoring a viewer's use of a device that sends an input, or causes an input to be sent, to the associated computer system.

14. The method of claim 1, wherein the timing of displayed advertisements on a screen displaying advertising is configured to not switch between advertisements if the screen displaying advertisements is minimized or occluded.

15. The method of claim 1, wherein monitoring the viewer's interactions with the associated computer system includes continually monitoring, during operation of the associated computer system, the viewer's interactions with the associated computer system.

16. The method of claim 1, wherein monitoring the viewer's interactions with the associated computer system includes monitoring the viewer's interactions with the associated computer system that are unrelated to a manual adjustment of the timing of the displayed advertisements.

17. The method of claim 1, wherein adjusting the timing of the later displayed advertisements includes varying lengths of time during which the advertisements are displayed on an advertisement-by-advertisement basis.

18. The method of claim 1 wherein monitoring a viewer's interactions comprises monitoring a viewer's interactions other than interactions indicating an amount of display time for which a later displayed advertisement is to be displayed on the viewer's associated computer system.

19. The method of claim 1 monitoring a viewer's interactions comprises monitoring a viewer's interactions with an application operating on the viewer's associated computer system, the application being other than an application for indicating the first amount of display time for which a later displayed advertisement is to be displayed on the viewer's associated computer system.

20. A computer-readable storage medium device storing a program for presenting advertising to viewers in a computer network environment, the program comprising: a monitoring code segment that cause a computer to monitor a viewer's interactions with an associated computer system; and an adjusting code segment that, based on the viewer's monitored interactions determined amount of time, causes the computer to vary a first amount of display time for which a later displayed advertisement is to be displayed on the viewer's associated computer system, the varied first amount of display time being different than a second amount of display time for which the later displayed advertisement is to be displayed on another viewer's associated computer system.

21. The computer-readable storage medium device of claim 20, wherein the adjusting code segment further causes the computer to adjust an ad expiration tuning parameter that sets the quantity of time for which an advertisement is available for display.

22. The computer-readable storage medium device of claim 20, wherein the adjusting code segment further causes the computer to adjust a maximum display count that sets a maximum number of times to display an advertisement to any individual user viewing a batch of advertisements.

23. The computer-readable storage medium device of claim 20, wherein the adjusting code segment causes the computer to adjust a minimum display time that sets a minimum amount of time to display an advertisement before another advertisement is displayed.

24. The computer-readable storage medium device of claim 20, wherein the adjusting code segment further causes the computer to adjust an idle delay that causes a delay from the time a user has gone idle before a first advertisement is replaced with another advertisement.

25. The computer-readable storage medium device of claim 20, wherein the adjusting code segment further causes the computer to adjust an active delay that causes a delay from the time a user goes active before displaying another advertisement.

26. The computer-readable storage medium device of claim 20, wherein the adjusting code segment further causes the computer to adjust an idle (no spin) parameter that stops the display of a first advertisement from being replaced with the display of another advertisement after a user goes idle.

27. The computer-readable storage medium device of claim 20, wherein the monitoring code segment causes the computer to monitor a viewer's interactions with an associated computer system by monitoring a use of a computer mouse.

28. The computer-readable storage medium device of claim 20, wherein the monitoring code segment causes the computer to monitor a viewer's interactions with an associated computer system by monitoring a use of a computer keyboard.

29. The computer-readable storage medium device of claim 20, wherein the monitoring code segment causes the computer to monitor a viewer's interactions with an associated computer system by monitoring a maximization and a minimization status of a screen displaying advertising.

30. The computer-readable storage medium device of claim 20, wherein the monitoring code segment causes the computer to monitor a viewer's interactions with an associated computer system by monitoring a viewer's use of a device that sends an input, or causes an input to be sent, to the associated computer system.

31. The computer-readable storage medium device of claim 20, wherein the monitoring code segment causes the computer to monitor a viewer's auditory interactions with an associated computer system by monitoring auditory signals.

32. The computer-readable storage medium device of claim 31, wherein the auditory signal is the viewer's voice.

33. The computer-readable storage medium device of claim 20, wherein the timing of displayed advertisements on a screen displaying advertising is configured to not switch between advertisements if the screen displaying advertisements is minimized or occluded.

34. The computer-readable storage medium device of claim 20, wherein the monitoring code segment causes the computer to monitor continually, during operation of the associated computer system, the viewer's interactions with the associated computer system.

35. The computer-readable storage medium device of claim 20, wherein the monitoring code segment causes the computer to monitor continually, during operation of the associated computer system, the viewer's interactions with the associated computer system that are unrelated to a manual adjustment of the timing of the displayed advertisements.

36. The computer-readable storage medium device of claim 20, wherein the adjusting code segment causes the computer to adjust the timing of the later displayed advertisements by varying lengths of time during which the advertisements are displayed on an advertisement-by-advertisement basis.

37. The computer-readable storage medium device of claim 20 wherein the monitoring code segment causes the computer to monitor a viewer's interactions other than interactions indicating the first amount of display time for which a later displayed advertisement is to be displayed on the viewer's associated computer system.

38. The computer-readable storage medium device of claim 20 wherein the monitoring code segment causes the computer to monitor a viewer's interactions with an application operating on the viewer's associated computer system, the application being other than an application for indicating the first amount of display time for which a later displayed advertisement is to be displayed on the viewer's associated computer system.

39. A method of optimizing a click-through rate of a user viewing content in a computer network environment, the method comprising: downloading advertisements and a set of tuning parameters to a user's computer, wherein the set of tuning parameters are configured to cause a display of a first advertisement on the user's computer to be changed to a display of another advertisement on the user's computer by varying a first amount of display time for which the later displayed advertisement is to be displayed based on a user's activity with respect to the user's computer, the varied first amount of display time being different than a second amount of display time for which the later displayed advertisement is to be displayed on another viewer's associated computer system; storing click-through information for the advertisements; and sending the click-through information to a host computer.

40. The method of claim 39, further comprising: varying the tuning parameters downloaded to the user's computer; and utilizing a correlation technique to determine a correlation between the tuning parameters downloaded to the user's computer and a click-through rate of the user.

41. The method of claim 40, further comprising setting another set of tuning parameters based on the correlation between the tuning parameters and the user click-through rate.

42. The method of claim 39, wherein the tuning parameters are configured to vary lengths of time during which the advertisements are displayed on an advertisement-by-advertisement basis.

43. A method of displaying advertisements to users, the method comprising: accessing data related to a particular user's interactions with a computer system used by the particular user; based on the accessed data related to the particular user's interactions with the computer system used by the particular user, determining an amount of time to display advertisements to the particular user; identifying an advertisement to be displayed to the particular user; accessing, from electronic storage, advertisement display attributes configured to control display of the identified advertisement, the advertisement display attributes including a general timing attribute that indicates an amount of time to display the advertisement to users; adjusting the general timing attribute based on the determined amount of time to display advertisements to the particular user; associating the adjusted general timing attribute with the advertisement to be displayed to the particular user as a user-specific timing attribute that indicates the amount of time to display the advertisement to the particular user; and causing a display of the advertisement to the particular user on the computer system used by the particular user such that the advertisement is displayed for the amount of time indicated by the user-specific timing attribute.

* * * * *